(12) United States Patent
Garyantes et al.

(10) Patent No.: US 12,322,868 B2
(45) Date of Patent: Jun. 3, 2025

(54) CONFIGURATION OF RADIO UNIT ANTENNA ELEMENTS

(71) Applicant: QUALCOMM Incorporated, San Diego, CA (US)

(72) Inventors: Michael Francis Garyantes, Bradley Beach, NJ (US); Abhishek Saurabh Sachidanand Sinha, San Diego, CA (US); Christian Oliver Thelen, San Diego, CA (US); Senthilkumar Sundaram, San Diego, CA (US); Orod Raeesi, Uusimaa (FI); James Krysl, San Diego, CA (US); Luca Blessent, Whitehouse Station, NJ (US); Deepak Agarwal, San Diego, CA (US)

( * ) Notice: Subject to any disclaimer, the term of this patent is extended or adjusted under 35 U.S.C. 154(b) by 164 days.

(21) Appl. No.: 18/189,867

(22) Filed: Mar. 24, 2023

(65) Prior Publication Data
US 2023/0402766 A1    Dec. 14, 2023

Related U.S. Application Data

(60) Provisional application No. 63/366,200, filed on Jun. 10, 2022.

(51) Int. Cl.
*H01Q 21/08*      (2006.01)
*H01Q 21/20*      (2006.01)

(52) U.S. Cl.
CPC ............. *H01Q 21/08* (2013.01); *H01Q 21/20* (2013.01)

(58) Field of Classification Search
CPC ...... H01Q 21/08; H01Q 21/20; H04B 7/0608; H04B 7/0617; H04B 7/0691
See application file for complete search history.

(56) References Cited

U.S. PATENT DOCUMENTS

| | | |
|---|---|---|
| 2012/0182174 A1 | 7/2012 | Feil |
| 2014/0113676 A1 | 4/2014 | Hamalainen et al. |
| 2021/0305693 A1 | 9/2021 | Howe et al. |
| 2022/0116872 A1 | 4/2022 | Horn et al. |

FOREIGN PATENT DOCUMENTS

| | | | | |
|---|---|---|---|---|
| CN | 107210826 B | * | 6/2021 | ........... H04B 17/382 |
| CN | 110168947 B | * | 8/2021 | ........... H04B 7/0404 |
| WO | WO-2020110004 A1 | * | 6/2020 | ........... H04B 7/0695 |
| WO | 2022036677 | | 2/2022 | |

OTHER PUBLICATIONS

Mohsin, M., et al., "On Analyzing Beamforming Implementation in O-RAN 5G," Electronics 2021 (Sep. 4, 2021), 17 pages.

(Continued)

*Primary Examiner* — Hoang V Nguyen

(57) ABSTRACT

Various aspects of the present disclosure generally relate to wireless communication. In some aspects, a radio unit (RU) may transmit, to a controller of the RU, a message including an ordered list of coordinates corresponding to a plurality of antenna elements in an antenna array of the RU. The RU may receive, from the controller, an indication of one or more low-level endpoints associated with one or more activated antenna elements of the plurality of antenna elements. Numerous other aspects are described.

30 Claims, 17 Drawing Sheets

(56) References Cited

OTHER PUBLICATIONS

O-RAN: "O-RAN Alliance Working Group 4: Management Plane Specification," O-RAN.WG4.MP.0-V08.00, Technical Specification (2022), 225 pages.
O-RAN: "O-RAN Fronthaul Working Group: Conformance Test Specification," O-RAN.WG4.CONF.0-v04.00.00, Technical Specification (2021), 354 pages.
O-RAN: "O-RAN Working Group 4 (Open Fronthaul Interfaces WG): Control, User and Synchronization Plane Specification," O-RAN.WG4.CUS.0-v08.01, Technical Specification (2022), 335 pages.
International Search Report and Written Opinion—PCT/US2023/016454—ISA/EPO—Jun. 20, 2023.
Lee J.S., et al., "Design of a Management Plane for 5G Open Fronthaul Interface", 2020 International Conference on Information and Communication Technology Convergence (ICTC), Oct. 21, 2020 (Oct. 21, 2020), pp. 946-948, XP055906671, DOI: 10.1109/ICTC49870.2020.9289612, ISBN: 978-1-7281-6758-9, the whole document.

* cited by examiner

1200

CONFIGURATION OF RADIO UNIT ANTENNA ELEMENTS

CROSS-REFERENCE TO RELATED APPLICATION

This Patent application claims priority to U.S. Provisional Patent Application No. 63/366,200, filed on Jun. 10, 2022, entitled "CONFIGURATION OF RADIO UNIT ANTENNA ELEMENTS" and is assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configuring radio unit antenna elements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless configuration performed by a radio unit (RU). The method may include transmitting, to a controller of the RU, a message including an ordered list of coordinates corresponding to a plurality of antenna elements in an antenna array of the RU. The method may include receiving, from the controller, an indication of one or more low-level endpoints associated with one or more activated antenna elements of the plurality of antenna elements.

Some aspects described herein relate to a method of wireless configuration performed by a controller of an RU. The method may include receiving, from the RU, a message including an ordered list of coordinates corresponding to a plurality of antenna elements in an antenna array of the RU. The method may include transmitting, to the RU, an indication of one or more low-level endpoints associated with one or more activated antenna elements of the plurality of antenna elements.

Some aspects described herein relate to an apparatus for wireless configuration at an RU. The apparatus may include a memory and one or more processors coupled to the memory. The one or more processors may be configured to transmit, to a controller of the RU, a message including an ordered list of coordinates corresponding to a plurality of antenna elements in an antenna array of the RU. The one or more processors may be configured to receive, from the controller, an indication of one or more low-level endpoints associated with one or more activated antenna elements of the plurality of antenna elements.

Some aspects described herein relate to an apparatus for wireless configuration at a controller of an RU. The apparatus may include a memory and one or more processors coupled to the memory. The one or more processors may be configured to receive, from the RU, a message including an ordered list of coordinates corresponding to a plurality of antenna elements in an antenna array of the RU. The one or more processors may be configured to transmit, to the RU, an indication of one or more low-level endpoints associated with one or more activated antenna elements of the plurality of antenna elements.

Some aspects described herein relate to a non-transitory computer-readable medium that stores a set of instructions for wireless communication by an RU. The set of instructions, when executed by one or more processors of the RU, may cause the RU to transmit, to a controller of the RU, a message including an ordered list of coordinates corresponding to a plurality of antenna elements in an antenna array of the RU. The set of instructions, when executed by one or more processors of the RU, may cause the RU to receive, from the controller, an indication of one or more low-level endpoints associated with one or more activated antenna elements of the plurality of antenna elements.

Some aspects described herein relate to a non-transitory computer-readable medium that stores a set of instructions for wireless communication by a controller of an RU. The set of instructions, when executed by one or more processors of the controller, may cause the controller to receive, from the RU, a message including an ordered list of coordinates corresponding to a plurality of antenna elements in an antenna array of the RU. The set of instructions, when executed by one or more processors of the controller, may cause the controller to transmit, to the RU, an indication of one or more low-level endpoints associated with one or more activated antenna elements of the plurality of antenna elements.

Some aspects described herein relate to an apparatus for wireless communication. The apparatus may include means for transmitting, to a controller of the apparatus, a message including an ordered list of coordinates corresponding to a plurality of antenna elements in an antenna array of the apparatus. The apparatus may include means for receiving, from the controller, an indication of one or more low-level endpoints associated with one or more activated antenna elements of the plurality of antenna elements.

Some aspects described herein relate to an apparatus for wireless communication. The apparatus may include means for receiving, from an RU, a message including an ordered list of coordinates corresponding to a plurality of antenna elements in an antenna array of the RU. The apparatus may include means for transmitting, to the RU, an indication of one or more low-level endpoints associated with one or more activated antenna elements of the plurality of antenna elements.

Aspects generally include a method, apparatus, system, computer program product, non-transitory computer-readable medium, user equipment, base station, network entity, network node, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
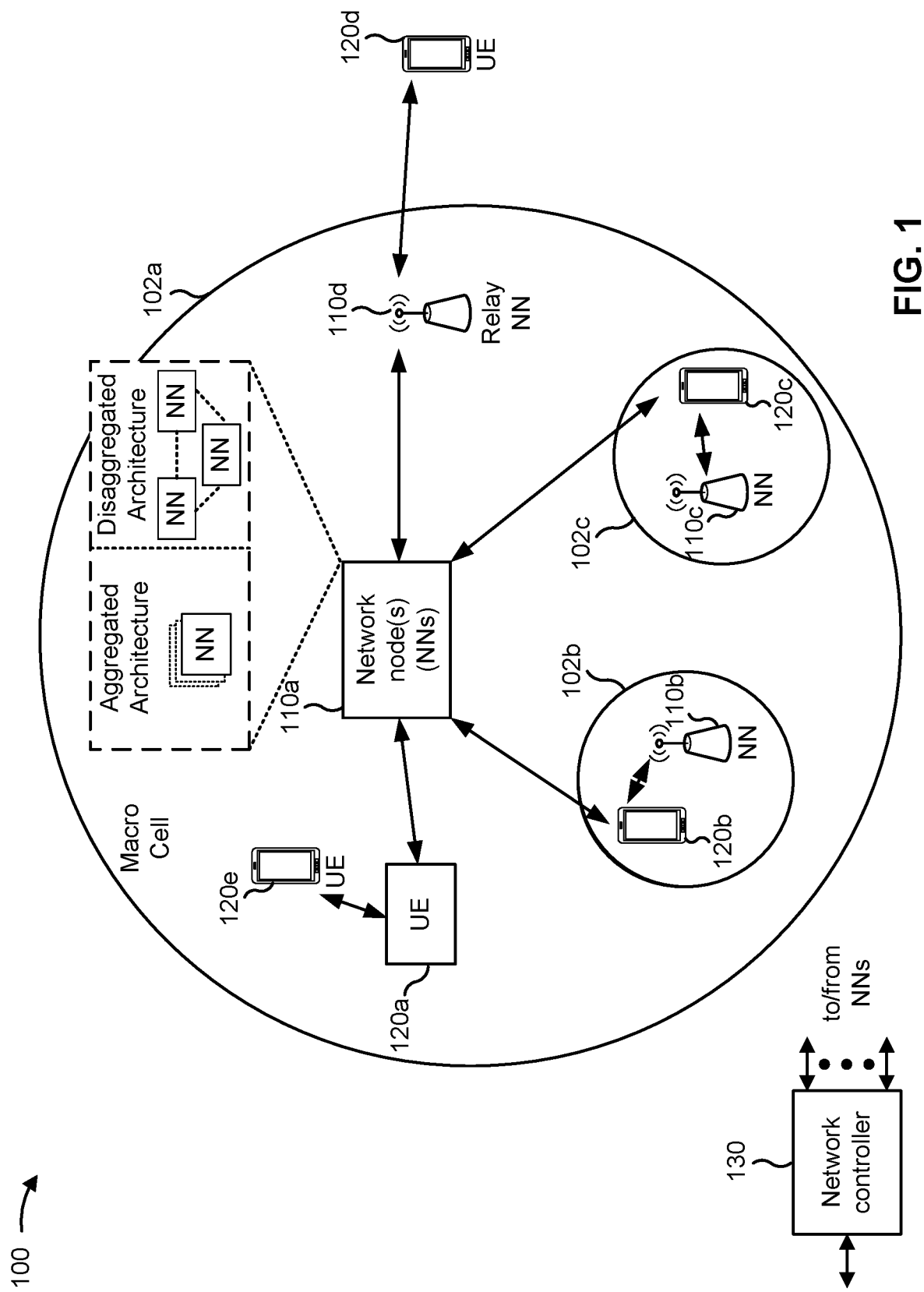
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 2:
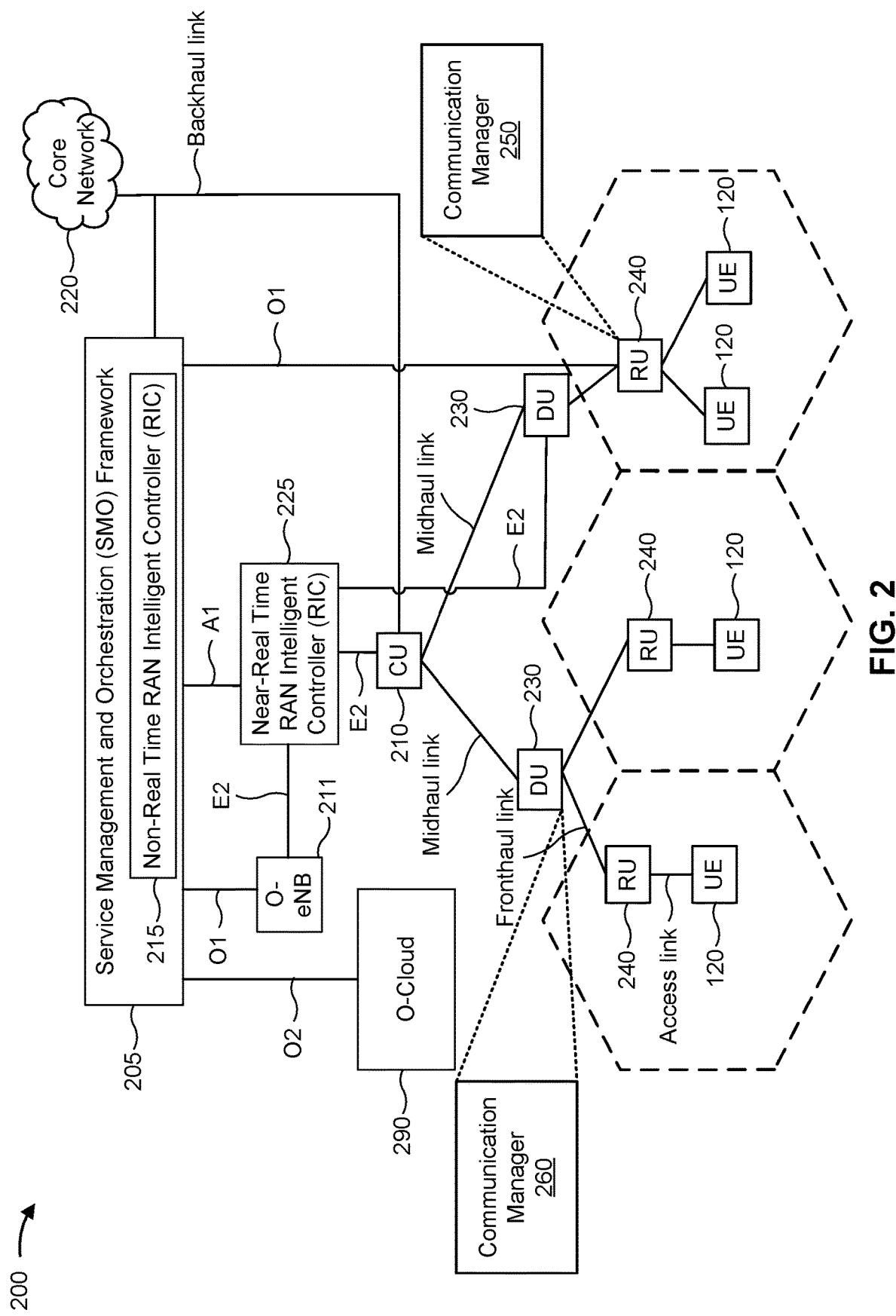
FIG. 2 is a diagram illustrating an example disaggregated base station architecture, in accordance with the present disclosure.

FIG. 2 is a diagram illustrating an example disaggregated base station architecture 200, in accordance with the present disclosure. The disaggregated base station architecture 200 may include a CU 210 that can communicate directly with a core network 220 via a backhaul link, or indirectly with the core network 220 through one or more disaggregated control units (such as a Near-RT RIC 225 via an E2 link, or a Non-RT RIC 215 associated with a Service Management and Orchestration (SMO) Framework 205, or both). A CU 210 may communicate with one or more DUs 230 via respective midhaul links, such as through F1 interfaces. Each of the DUs 230 may communicate with one or more RUs 240 via respective fronthaul links Each of the RUs 240 may communicate with one or more UEs 120 via respective radio frequency (RF) access links. In some implementations, a UE 120 may be simultaneously served by multiple RUs 240.

Each of the units, including the CUs 210, the DUs 230, the RUs 240, as well as the Near-RT RICs 225, the Non-RT RICs 215, and the SMO Framework 205, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 210. The CU 210 may be configured to handle user plane functionality (for example, Central Unit-User Plane (CU-UP) functionality), control plane functionality (for example, Central Unit-Control Plane (CU-CP) functionality), or a combination thereof. In some implementations, the CU 210 can be logically split into one or more CU-UP units and one or more CU-CP units. A CU-UP unit can communicate bidirectionally with a CU-CP unit via an interface, such as the E1 interface when implemented in an O-RAN configuration. The CU 210 can be implemented to communicate with a DU 230, as necessary, for network control and signaling.

Each DU 230 may correspond to a logical unit that includes one or more base station functions to control the operation of one or more RUs 240. In some aspects, the DU 230 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 230 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 230, or with the control functions hosted by the CU 210.

Each RU 240 may implement lower-layer functionality. In some deployments, an RU 240, controlled by a DU 230, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 240 can be operated to handle over the air (OTA) communication with one or more UEs 120. In some implementations, real-time and non-real-time aspects of control and user plane communication with the RU(s) 240 can be controlled by the corresponding DU 230. In some scenarios, this configuration can enable each DU 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements, which may be managed via an operations and maintenance interface (such as an O1 interface). For virtualized network elements, the SMO Framework 205 may be configured to interact with a cloud computing platform (such as an open cloud (O-Cloud) platform 290) to perform network element life cycle management (such as to instantiate virtualized network elements) via a cloud computing platform interface (such as an O2 interface). Such virtualized network elements can include, but are not limited to, CUs 210, DUs 230, RUs 240, non-RT RICs 215, and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with each of one or more RUs 240 via a respective O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via an O1 interface) or via creation of RAN management policies (such as A1 interface policies).

In some aspects, an RU (e.g., the RU 240 and/or apparatus 1600 of FIG. 16) may include a communication manager 250. As described in more detail elsewhere herein, the communication manager 250 may transmit (e.g., to a controller of the RU, such as the DU 230 and/or the SMO Framework 205) a message including an ordered list of coordinates corresponding to a plurality of antenna elements in an antenna array of the RU, and receive (e.g., from the controller) an indication of one or more low-level endpoints associated with one or more activated antenna elements of the plurality of antenna elements. Additionally, or alternatively, the communication manager 250 may perform one or more other operations described herein.

Figure 17:
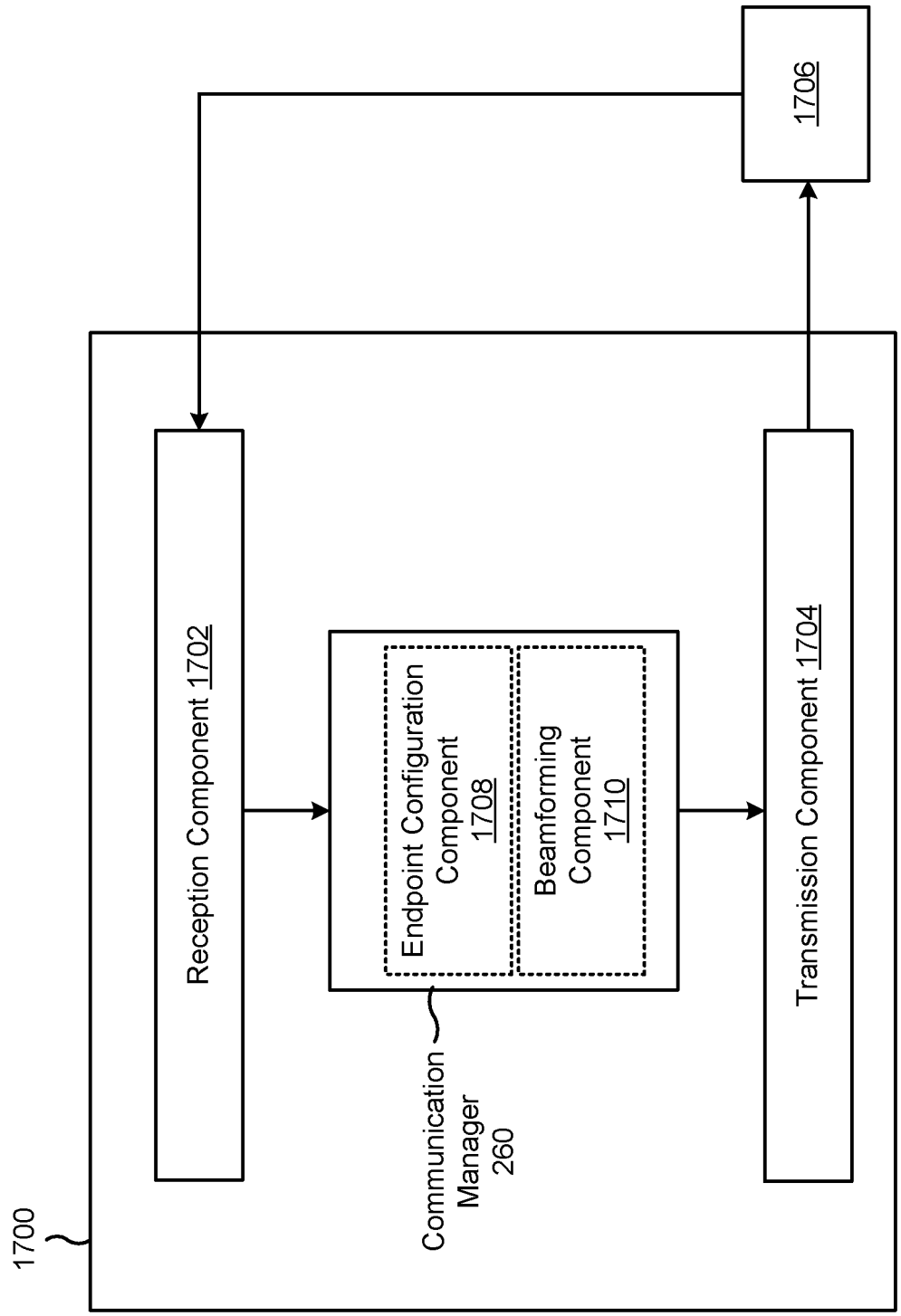

In some aspects, a controller of the RU 240 (e.g., the DU 230, the SMO Framework 205, and/or apparatus 1700 of FIG. 17) may include a communication manager 260. As described in more detail elsewhere herein, the communication manager 260 may receive (e.g., from the RU 240) a message including an ordered list of coordinates corresponding to a plurality of antenna elements in an antenna array of the RU 240, and transmit (e.g., to the RU 240) an indication of one or more low-level endpoints associated with one or more activated antenna elements of the plurality of antenna elements. Additionally, or alternatively, the communication manager 260 may perform one or more other operations described herein.

As indicated above, FIG. 2 is provided as an example. Other examples may differ from what is described with regard to FIG. 2.

Figure 3:
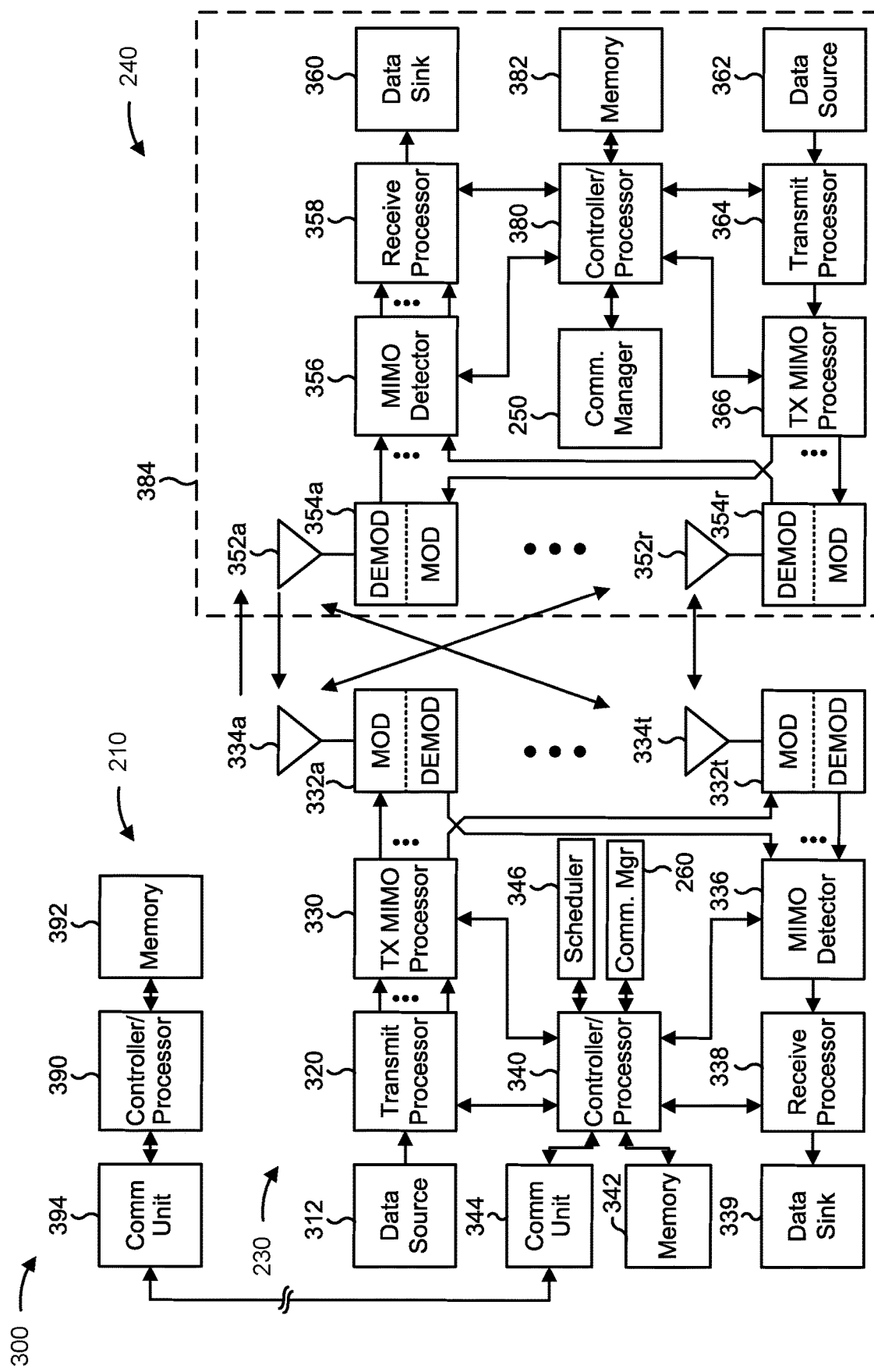
FIG. 3 is a diagram illustrating an example of a distributed unit in communication with a radio unit (RU) in a wireless network, in accordance with the present disclosure.

FIG. 3 is a diagram illustrating an example 300 of a DU 230 in communication with an RU 240 in a wireless network 100, in accordance with the present disclosure. The DU 230 may be equipped with a set of antennas 334a through 334t, such as T antennas (T≥1). The RU 240 may be equipped with a set of antennas 352a through 352r, such as R antennas (R≥1). The DU 230 of example 300 includes one or more radio frequency components, such as antennas 334 and a modem 354. In some examples, a DU 230 may include an interface, a communication component, or another component that facilitates communication with the RU 240 or another network node. Some DUs 230 may not include radio frequency components that facilitate direct communication with the RU 240. For example, the DU 230 may communicate with the RU 240 on a wired connection (e.g., a wired Ethernet connection).

At the DU 230, a transmit processor 320 may receive data, from a data source 312, intended for the RU 240 (or a set of RUs 240). The transmit processor 320 may select one or more modulation and coding schemes (MCSs) for the RU 240. The DU 230 may process (e.g., encode and modulate) the data for the RU 240 based at least in part on the MCS(s) selected and may provide data symbols for the RU 240. The transmit processor 320 may process system information (e.g., for semi-static resource partitioning information (SRPI)) and control information (e.g., channel quality indicator (CQI) requests, grants, and/or upper layer signaling) and provide overhead symbols and control symbols. The transmit processor 320 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 332 (e.g., T modems), shown as modems 332a through 332t. For example, each output symbol stream may be provided to a modulator component (shown as MOD) of a modem 332. Each modem 332 may use a respective modulator component to process a respective output symbol stream (e.g., for OFDM) to obtain an output sample stream. Each modem 332 may further use a respective modulator component to process (e.g., convert to analog, amplify, filter, and/or upconvert) the output sample stream to obtain a downlink signal. The modems 332a through 332t may transmit a set of downlink signals (e.g., T downlink signals) via a corresponding set of antennas 334 (e.g., T antennas), shown as antennas 334a through 334t.

At the RU 240, a set of antennas 352 (shown as antennas 352a through 352r) may receive the downlink signals from the DU 230 and/or other DUs 230 and may provide a set of received signals (e.g., R received signals) to a set of modems 354 (e.g., R modems), shown as modems 354a through 354r. For example, each received signal may be provided to a demodulator component (shown as DEMOD) of a modem 354. Each modem 354 may use a respective demodulator component to condition (e.g., filter, amplify, downconvert, and/or digitize) a received signal to obtain input samples. Each modem 354 may apply weights to distribute the input samples (e.g., for OFDM) over antenna elements (e.g., for wireless transmission to a UE). A MIMO detector 356 may distribute the input samples over antenna elements logically grouped into a plurality of data streams A receive processor 358 may process control information from the DU 230, may provide control information and/or input samples for caching to a data sink 360, and may provide control information and system information to a controller/processor 380. The term "controller/processor" may refer to one or more controllers, one or more processors, or a combination thereof. In some examples, one or more components of the RU 240 may be included in a housing 384.

The CU 210 may include a communication unit 394, a controller/processor 390, and a memory 392. The CU 210 may include, for example, one or more devices in a core network. The CU 210 may communicate with the DU 230 via the communication unit 394.

One or more antennas (e.g., antennas 334a through 334t and/or antennas 352a through 352r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 3.

At the RU 240, a transmit processor 364 may receive and process signals from the antenna elements (e.g., cached in a data source 362) and control information from the controller/processor 380. The symbols from the transmit processor 364 may be decoded by a TX MIMO processor 366 if applicable, further processed by the modems 354 (e.g., for DFT-s-OFDM or CP-OFDM), and transmitted to the DU 230. In some examples, the modem 354 of the RU 240 may include a modulator and a demodulator. In some examples, the RU 240 includes a transceiver. The transceiver may include any combination of the antenna(s) 352, the modem(s) 354, the MIMO detector 356, the receive processor 358, the transmit processor 364, and/or the TX MIMO processor 366. The transceiver may be used by a processor (e.g., the controller/processor 380) and the memory 382 to perform aspects of any of the methods described herein (e.g., with reference to FIGS. 4-14).

At the DU 230, signals from RU 240 and/or other RUs 240 may be received by the antennas 334, processed by the modem 332 (e.g., a demodulator component, shown as DEMOD, of the modem 332), detected by a MIMO detector 336 if applicable, and further processed by a receive processor 338 to obtain decoded data and control information received at the RU 240. The receive processor 338 may provide the decoded data to a data sink 339 and provide the decoded control information to the controller/processor 340. The DU 230 may include a communication unit 344 and may communicate with the CU 210 via the communication unit 344. The DU 230 may include a scheduler 346 to schedule one or more RUs 240 for downlink and/or uplink communications (e.g., with one or more UEs). In some examples, the modem 332 of the DU 230 may include a modulator and a demodulator. In some examples, the DU 230 includes a transceiver. The transceiver may include any combination of the antenna(s) 334, the modem(s) 332, the MIMO detector 336, the receive processor 338, the transmit processor 320, and/or the TX MIMO processor 330. The transceiver may be used by a processor (e.g., the controller/processor 340) and the memory 342 to perform aspects of any of the methods described herein (e.g., with reference to FIGS. 4-14).

The controller/processor 340 of the DU 230, the controller/processor 380 of the RU 240, and/or any other component(s) of FIG. 3 may perform one or more techniques associated with configuring RU antenna elements, as described in more detail elsewhere herein. For example, the controller/processor 340 of the DU 230, the controller/processor 380 of the RU 240, and/or any other component(s) of FIG. 3 may perform or direct operations of, for example, process 1400 of FIG. 14, process 1500 of FIG. 15, and/or other processes as described herein. The memory 342 and the memory 382 may store data and program codes for the DU 230 and the RU 240, respectively. In some examples, the memory 342 and/or the memory 382 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the DU 230 and/or the RU 240, may cause the one or more processors, the RU 240, and/or the DU 230 to perform or direct operations of, for example, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, an RU (e.g., the RU 240 and/or apparatus 1600 of FIG. 16) may include means for transmitting, to a controller of the RU (e.g., the DU 230, an SMO Framework 205, and/or apparatus 1700 of FIG. 17), a message including an ordered list of coordinates corresponding to a plurality of antenna elements in an antenna array of the RU; and/or means for receiving, from the controller, an indication of one or more low-level endpoints associated with one or more activated antenna elements of the plurality of antenna elements. In some aspects, the means for the RU to perform operations described herein may include, for example, one or more of communication manager 250, antenna 352, modem 354, MIMO detector 356, receive processor 358, transmit processor 364, TX MIMO processor 366, controller/processor 380, or memory 382.

In some aspects, a controller of an RU (e.g., the DU 230, an SMO Framework 205, and/or apparatus 1700 of FIG. 17) may include means for receiving, from the RU (e.g., the RU 240 and/or apparatus 1600 of FIG. 16), a message including an ordered list of coordinates corresponding to a plurality of antenna elements in an antenna array of the RU; and/or means for transmitting, to the RU, an indication of one or more low-level endpoints associated with one or more activated antenna elements of the plurality of antenna elements. In some aspects, the means for the controller to perform operations described herein may include, for example, one or more of communication manager 260, transmit processor 320, TX MIMO processor 330, modem 332, antenna 334, MIMO detector 336, receive processor 338, controller/processor 340, memory 342, or scheduler 346.

While blocks in FIG. 3 are illustrated as distinct components, the functions described above with respect to the blocks may be implemented in a single hardware, software, or combination component or in various combinations of components. For example, the functions described with respect to the transmit processor 364, the receive processor 358, and/or the TX MIMO processor 366 may be performed by or under the control of the controller/processor 380.

As indicated above, FIG. 3 is provided as an example. Other examples may differ from what is described with regard to FIG. 3.

A controller of an RU, such as a DU or an SMO Framework, receives messages from the RU that convey information about the RU itself. Accordingly, the RU may self-describe to the controller. These messages may include tx-array and rx-array data structures that describe antenna panels (and antenna elements included thereon) that the RU has available for transmitting and receiving. However, O-RAN configurations (such as the network configuration sponsored by the O-RAN Alliance) generally assume rectangular antenna panels. In particular, the tx-array and rx-array data structures indicate a quantity of rows, a quantity of columns, a horizontal spacing, and a vertical spacing. Therefore, the tx-array and rx-array data structures cannot indicate non-rectangular antenna panels or rectangular antenna panels with irregular spacing.

Additionally, O-RAN configurations (such as the network configuration sponsored by the O-RAN Alliance) describe the antenna elements of an antenna panel in a static, predefined order. This order is used when input signals are provided from the controller to the RU (e.g., for transmission OTA). Accordingly, input signals have to be cached when the order switches between integrated circuits (ICs) that control antenna elements. In one example, when antenna elements that are first and third in the order are controlled by a first IC and antenna elements that are second and fourth in the order are controlled by a second IC, the RU caches input signals associated with the second antenna element while feeding input signals associated with the third antenna element to the first IC, followed by retrieving the cached input signals to feed to the second IC along with input signals associated with the fourth antenna element. As a result, power, processing resources, and storage are all wasted, and latency between receiving the input signals and energizing the antenna elements is increased.

Some techniques and apparatuses described herein enable an RU (e.g., RU 240) to report antenna elements in an antenna panel as an ordered list of coordinates to a controller (e.g., DU 230 and/or SMO Framework 205). As a result, the RU 240 may report non-rectangular or non-planar antenna arrays, which may conserve power for some beamforming configurations. Non-rectangular and non-planar arrays may also be referred to as "free-form array."

Additionally, the RU 240 may report the antenna elements in an order other than a static, predefined order (e.g., left-to-right and bottom-to-top according to the network configuration sponsored by the O-RAN Alliance). Accordingly, the RU 240 may report the antenna elements in an order, for example, according to ICs controlling the antenna elements. As a result, the RU 240 may reduce, or even eliminate, caching of input signals from the controller in order to conserve power, processing resources, and storage. Additionally, the RU 240 reduces latency between receiving the input signals and energizing the antenna elements.

Figure 4:
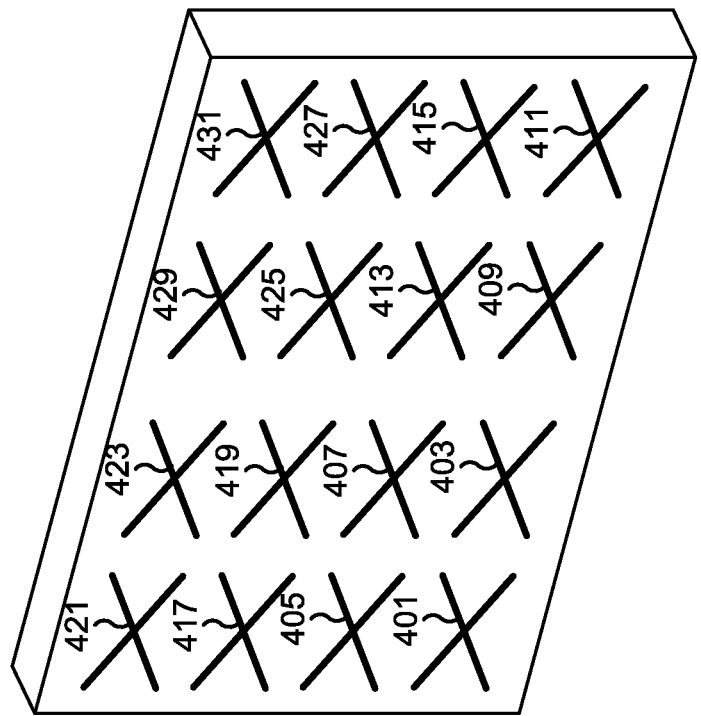
FIG. 4 is a diagram illustrating an example associated with a rectangular array of antenna elements, in accordance with the present disclosure.

FIG. 4 is a diagram illustrating an example 400 associated with a rectangular array of antenna elements, in accordance with the present disclosure. As shown in FIG. 4, example 400 includes an antenna panel of an RU 240 with a plurality of antenna elements. In example 400, each antenna element has two possible polarizations. Accordingly, when describing antenna elements (e.g., in a tx-array or an rx-array data structure) to a controller of the RU 240 (e.g., a DU 230 and/or an SMO Framework 205), the RU 240 may report a single polarization for an antenna element (e.g., +45° or −45°, among other examples) or a combined polarization for the antenna element.

As described in connection with FIG. 13, the RU 240 may indicate each antenna element in the antenna panel as an element in an ordered list. For example, the RU 240 may use an antenna-element-ordered-list data structure that includes data elements describing coordinates (e.g., three-dimensional coordinate data elements, such as x-coordinate, y-coordinate, and z-coordinate, along with a polarisation data element) for each antenna element. The coordinates may be expressed in units of 0.01 millimeters (mm). Alternatively, the coordinates may be expressed in larger units (e.g., 0.1 mm, 0.2 mm, and so on) or in smaller units (e.g., 0.005 mm, 0.001 mm, and so on). The coordinates are relative to an origin. In one example, the origin may correspond to a lower-left antenna element 401. In other examples, the origin may correspond to a different antenna element or to a point not coinciding with an antenna element. The coordinates may thus be positive or negative.

Additionally, the list indicates the antenna elements in order (e.g., according to an antenna-element-index data element corresponding to each antenna element). Accordingly, as shown in FIG. 4, the RU 240 may report the antenna elements in an order other than left-to-right and bottom-to-top. In example 400, the RU 240 reports the antenna elements by quadrant. Accordingly, antenna elements 401, 403, 405, and 407 are reported first and are associated with a first quadrant, and antenna elements 409, 411, 413, and 415 are reported next and are associated with a second quadrant. Similarly, antenna elements 417, 419, 421, and 423 are reported thereafter and are associated with a third quadrant, and antenna elements 425, 427, 429, and 431 are reported next and are associated with a fourth quadrant. In some aspects, each quadrant may be associated with an IC that controls the antenna elements in the quadrant.

By using techniques as described in connection with FIG. 4, the RU 240 may report antenna elements in an order other than a static, predefined order (e.g., left-to-right and bottom-to-top according to the network configuration sponsored by the O-RAN Alliance). Accordingly, the RU 240 may report the antenna elements in an order, for example, according to ICs controlling the antenna elements. As a result, the RU 240 may reduce, or even eliminate, caching of input signals from the controller in order to conserve power, processing resources, and storage. Additionally, the RU 240 reduces latency between receiving the input signals and energizing the antenna elements.

In one example, the controller may activate every other antenna element in the ordered list so as to conserve power at the RU 240 while not reducing aperture of a beam formed by the activated antenna elements. For example, the controller may establish low-level endpoints (e.g., as described in connection with FIG. 13) to achieve these power savings. As used herein, "low-level endpoint" refers to a portion of an RU associated with an address such that input signals with that address are routed to the portion of the RU associated with that address.

Additionally, or alternatively, the controller may activate a subset of the set of antenna elements in order to conserve power at the RU 240. The controller may conserve power and processing resources when doing so because the controller may refrain from establishing low-level endpoints associated with the non-activated antenna elements and thus reduce throughput from the controller to the RU 240 when transmitting weights to the RU 240 for beamforming.

As indicated above, FIG. 4 is provided as an example. Other examples may differ from what is described with respect to FIG. 4.

Figure 5:
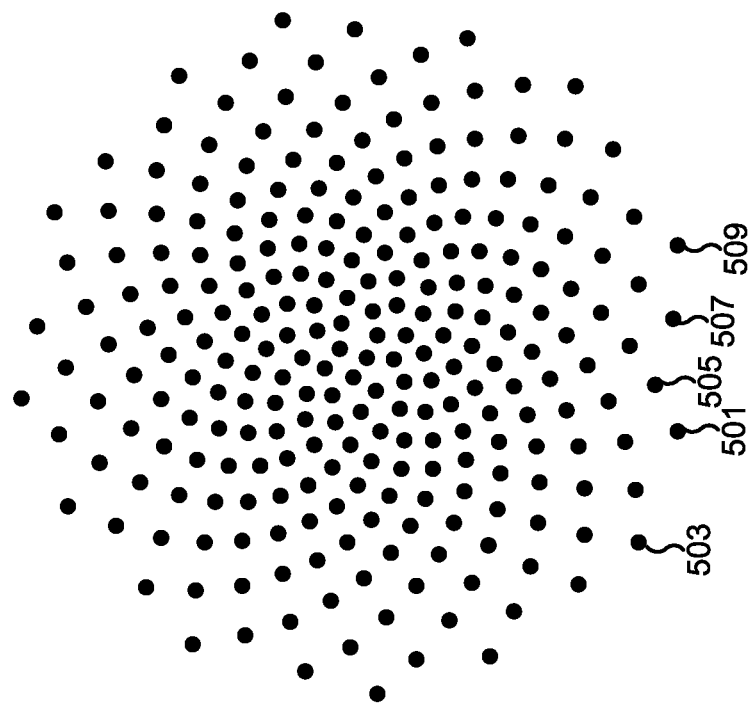
FIG. 5 is a diagram illustrating an example associated with a sunflower antenna array, in accordance with the present disclosure.

FIG. 5 is a diagram illustrating an example 500 associated with a sunflower antenna array, in accordance with the present disclosure. As shown in FIG. 5, example 500 includes an antenna panel of an RU 240 with a plurality of antenna elements.

In example 500, the antenna array is non-rectangular. Accordingly, the RU 240 may describe the antenna elements (e.g., in a tx-array or an rx-array data structure) to a controller of the RU 240 (e.g., a DU 230 and/or an SMO Framework 205) in an ordered list that includes data elements describing coordinates (e.g., three-dimensional coordinate data elements, such as x-coordinate, y-coordinate, and z-coordinate, along with a polarisation data element) for each antenna element. The coordinates are relative to an origin. In one example, the origin may correspond to a lowest antenna element 501. In other examples, the origin may correspond to a different antenna element or to a point not coinciding with an antenna element.

Additionally, the list indicates the antenna elements in order (e.g., according to an antenna-element-index data element corresponding to each antenna element). Accordingly, as shown in FIG. 5, the RU 240 may report the antenna elements in an order such as antenna element 501, then antenna element 503, then antenna element 505, then antenna element 507, then antenna element 509, and so on. The RU 240 may select any order in which to report the antenna elements because the RU 240 indicates coordinates for each antenna element.

Figure 6:
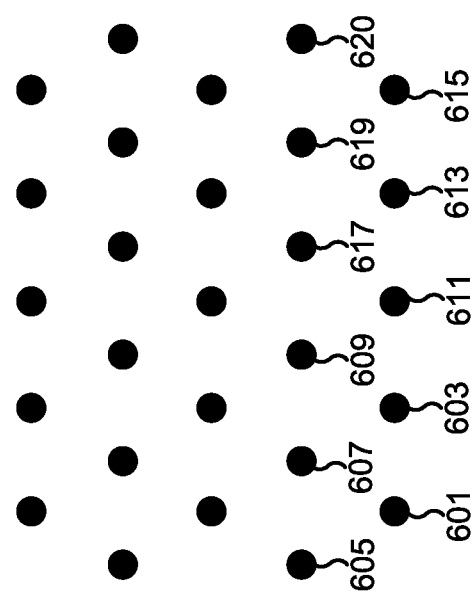
FIG. 6 is a diagram illustrating an example associated with a triangular antenna array, in accordance with the present disclosure.

FIG. 6 is a diagram illustrating an example 600 associated with a triangular antenna array, in accordance with the present disclosure. As shown in FIG. 6, example 600 includes an antenna panel of an RU 240 with a plurality of antenna elements.

In example 600, the antenna array is non-rectangular. Accordingly, the RU 240 may describe the antenna elements (e.g., in a tx-array or an rx-array data structure) to a controller of the RU 240 (e.g., a DU 230 and/or an SMO Framework 205) in an ordered list that includes data elements describing coordinates (e.g., three-dimensional coordinate data elements, such as x-coordinate, y-coordinate, and z-coordinate, along with a polarisation data element) for each antenna element. The coordinates are relative to an origin. In one example, the origin may correspond to a lower-left antenna element 601. In other examples, the origin may correspond to a different antenna element or to a point not coinciding with an antenna element. The coordinates may thus be positive or negative.

Additionally, the list indicates the antenna elements in order (e.g., according to an antenna-element-index data element corresponding to each antenna element). Accordingly, as shown in FIG. 6, the RU 240 may report the antenna elements in an order other than left-to-right and bottom-to-top. In example 600, the RU 240 reports the antenna elements by section. Accordingly, antenna elements 601, 603, 605, 607, and 609 are reported first and are associated with a first section, and antenna elements 611, 613, 615, 617, 619, and 620 are reported next and are associated with a second section. In some aspects, each section may be associated with an IC that controls the antenna elements in the section.

Figure 7:
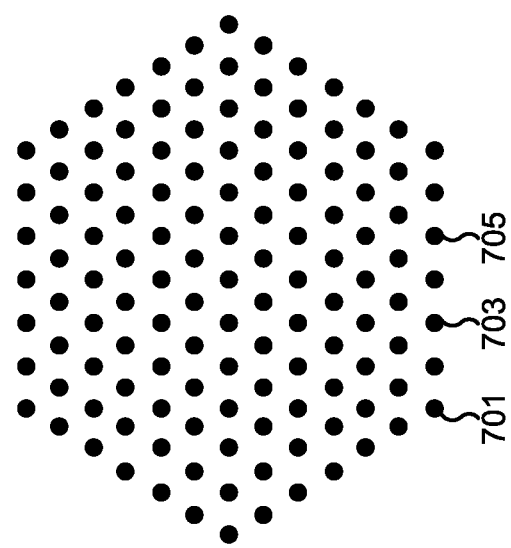
FIG. 7 is a diagram illustrating an example associated with a hexagonal antenna array, in accordance with the present disclosure.

FIG. 7 is a diagram illustrating an example 700 associated with a hexagonal antenna array, in accordance with the present disclosure. As shown in FIG. 7, example 700 includes an antenna panel of an RU 240 with a plurality of antenna elements.

In example 700, the antenna array is non-rectangular. Accordingly, the RU 240 may describe the antenna elements (e.g., in a tx-array or an rx-array data structure) to a controller of the RU 240 (e.g., a DU 230 and/or an SMO Framework 205) in an ordered list that includes data elements describing coordinates (e.g., three-dimensional coordinate data elements, such as x-coordinate, y-coordinate, and z-coordinate, along with a polarisation data element) for each antenna element. The coordinates are relative to an origin. In one example, the origin may correspond to a lower-left antenna element 701. In other examples, the origin may correspond to a different antenna element or to a point not coinciding with an antenna element. The coordinates may thus be positive or negative.

Additionally, the list indicates the antenna elements in order (e.g., according to an antenna-element-index data element corresponding to each antenna element). Accordingly, as shown in FIG. 7, the RU 240 may report the antenna elements in an order such as antenna element 701, then antenna element 703, then antenna element 705, and so on. For example, the RU 240 may report every other antenna element because the RU 240 is damaged and/or is conserving power.

Figure 8:
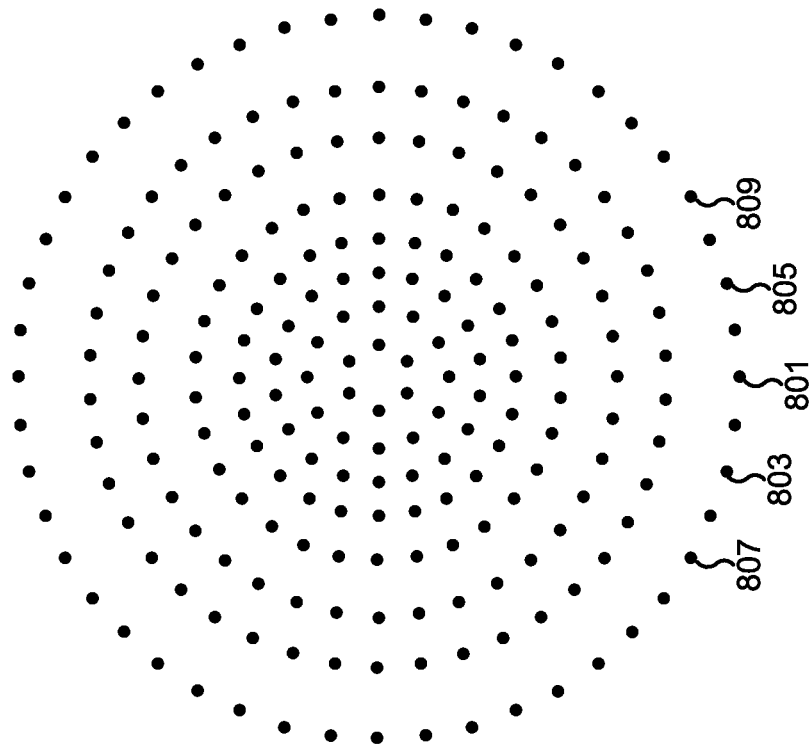
FIG. 8 is a diagram illustrating an example associated with a circular antenna array, in accordance with the present disclosure.

FIG. 8 is a diagram illustrating an example 800 associated with a circular antenna array, in accordance with the present disclosure. As shown in FIG. 8, example 800 includes an antenna panel of an RU 240 with a plurality of antenna elements.

In example 800, the antenna array is non-rectangular. Accordingly, the RU 240 may describe the antenna elements (e.g., in a tx-array or an rx-array data structure) to a controller of the RU 240 (e.g., a DU 230 and/or an SMO Framework 205) in an ordered list that includes data elements describing coordinates (e.g., three-dimensional coordinate data elements, such as x-coordinate, y-coordinate, and z-coordinate, along with a polarisation data element) for each antenna element. The coordinates are relative to an origin. In one example, the origin may correspond to a lowest antenna element 801. In other examples, the origin may correspond to a different antenna element or to a point not coinciding with an antenna element. The coordinates may thus be positive or negative.

Additionally, the list indicates the antenna elements in order (e.g., according to an antenna-element-index data element corresponding to each antenna element). Accordingly, as shown in FIG. 8, the RU 240 may report the antenna elements in an order such as antenna element 801, then antenna element 803, then antenna element 805, then antenna element 807, then antenna element 809, and so on. For example, the RU 240 may report every other antenna element because the RU 240 is damaged and/or is conserving power.

Figure 9:
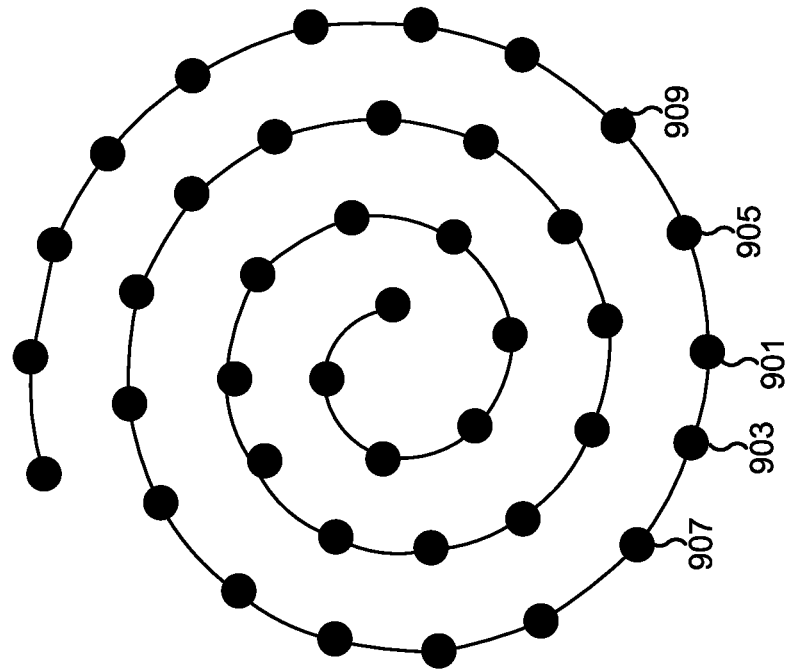
FIG. 9 is a diagram illustrating an example associated with a spherical spiral antenna array, in accordance with the present disclosure.

FIG. 9 is a diagram illustrating an example 900 associated with a spherical spiral antenna array, in accordance with the present disclosure. As shown in FIG. 9, example 900 includes an antenna panel of an RU 240 with a plurality of antenna elements.

In example 900, the antenna array is non-rectangular. Accordingly, the RU 240 may describe the antenna elements (e.g., in a tx-array or an rx-array data structure) to a controller of the RU 240 (e.g., a DU 230 and/or an SMO Framework 205) in an ordered list that includes data elements describing coordinates (e.g., three-dimensional coordinate data elements, such as x-coordinate, y-coordinate, and z-coordinate, along with a polarisation data element) for each antenna element. The coordinates are relative to an origin. In one example, the origin may correspond to a lowest antenna element 901. In other examples, the origin may correspond to a different antenna element or to a point not coinciding with an antenna element. The coordinates may thus be positive or negative.

Additionally, the list indicates the antenna elements in order (e.g., according to an antenna-element-index data element corresponding to each antenna element). Accordingly, as shown in FIG. 9, the RU 240 may report the antenna elements in an order such as antenna element 901, then antenna element 903, then antenna element 905, then antenna element 907, then antenna element 909, and so on. For example, the RU 240 may report alternating antenna elements rather than along a line.

Thus, the ordered list described in connection with FIGS. 5-9 enables description of non-rectangular antenna arrays (and rectangular antenna arrays with irregular spacing). By reporting the antenna elements as described in connection with FIGS. 5-9, the controller may thus provide weights for beamforming using non-rectangular antenna arrays, such as those in examples 500, 600, 700, 800, and 900. As a result, the controller and the RU 240 may conserve power for some beamforming configurations by using non-rectangular antenna panels.

As indicated above, FIGS. 5-9 are provided as examples. Other examples may differ from what is described with respect to FIGS. 5-9.

Figure 10:
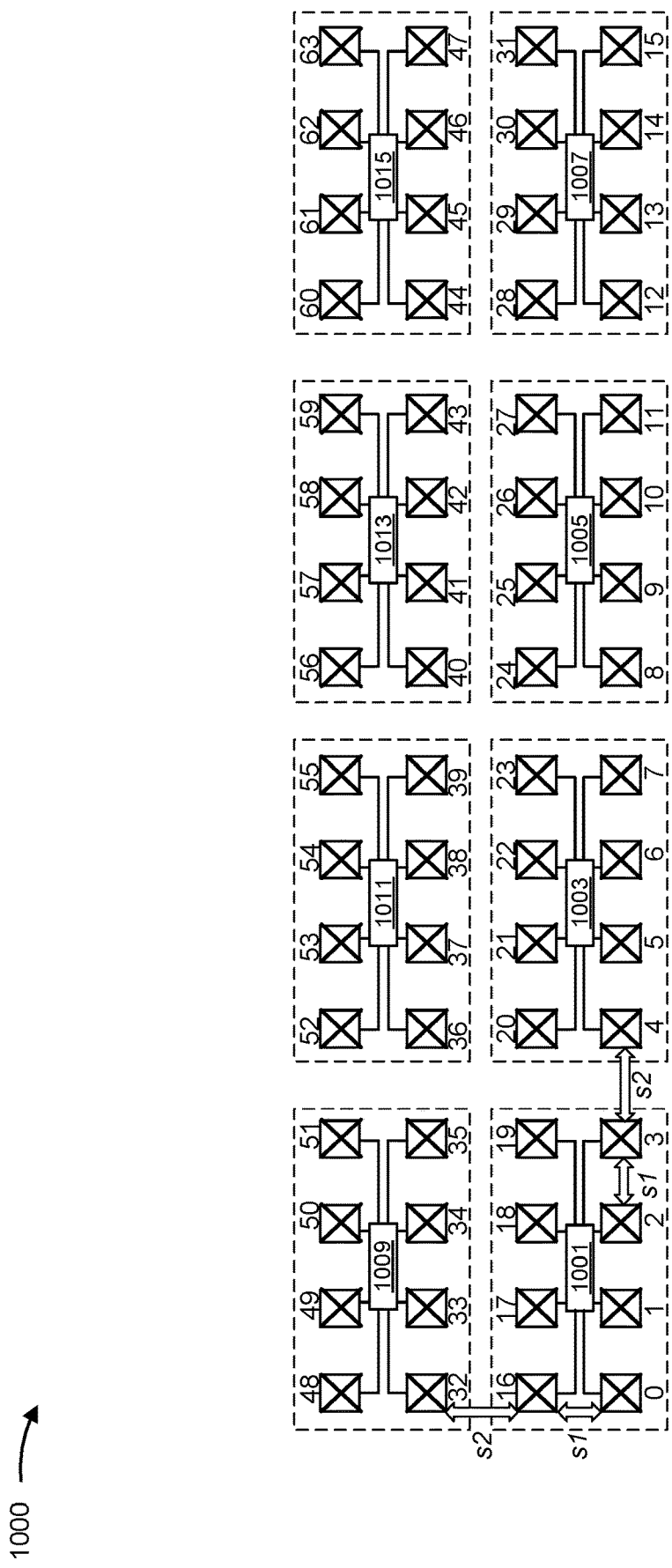
FIG. 10 is a diagram illustrating an example associated with a rectangular antenna array, in accordance with the present disclosure.

FIG. 10 is a diagram illustrating an example 1000 associated with a rectangular antenna array, in accordance with the present disclosure. As shown in FIG. 10, example 1000 includes an antenna panel of an RU 240 with a plurality of antenna elements. Although the example 1000 includes 64 antenna elements (indexed from 0 through 63), other examples may include fewer antenna elements or additional antenna elements.

In example 1000, the antenna array is rectangular. Each cluster of eight antenna elements is controlled by a corresponding IC. In example 1000, IC 1001 controls antenna elements associated with indices 0, 1, 2, 3, 16, 17, 18, and 19; IC 1003 controls antenna elements associated with indices 4, 5, 6, 7, 20, 21, 22, and 23; IC 1005 controls antenna elements associated with indices 8, 9, 10, 11, 24, 25, 26, and 27; and IC 1007 controls antenna elements associated with indices 12, 13, 14, 15, 28, 29, 30, and 31. Similarly, IC 1009 controls antenna elements associated with indices 32, 33, 34, 35, 48, 49, 50, and 51; IC 1011 controls antenna elements associated with indices 36, 37, 38, 39, 52, 53, 54, and 55; IC 1013 controls antenna elements associated with indices 40, 41, 42, 43, 56, 57, 58, and 59; and IC 1015 controls antenna elements associated with indices 44, 45, 46, 47, 60, 61, 62, and 63. Therefore, the RU 240 may report the antenna array such that beamforming weights are received in the following order of antenna element indices: 0, 1, 2, 3, 16, 17, 18, 19; 4, 5, 6, 7, 20, 21, 22, 23; 8, 9, 10, 11, 24, 25, 26, 27; 12, 13, 14, 15, 28, 29, 30, 31; 44, 45, 46, 47, 60, 61, 62, 63; 40, 41, 42, 43, 56, 57, 58, 59; 36, 37, 38, 39, 52, 53, 54, 55; 32, 33, 34, 35, 48, 49, 50, 51. As a result, the RU 240 may reduce caching of the beamforming weights because the beamforming weights may be fed sequentially to each IC (e.g., in the following order: IC 1001, IC 1003, IC 1005, IC 1007, IC 1015, IC 1013, IC 1011, and IC 1009).

As further shown in FIG. 10, a spacing between antenna elements controlled by a same IC (e.g., between antenna elements 2 and 3 or between antenna elements 0 and 16, and represented by s1 in FIG. 10) may be smaller than a spacing between antenna elements controlled by different ICs (e.g., between antenna elements 3 and 4 or between antenna elements 16 and 32, and represented by s2 in FIG. 10). Accordingly, the RU 240 may report coordinates of each antenna element such that a controller of the RU 240 is aware of the unequal spacing. Other examples may use a spacing between antenna elements controlled by a same IC that is larger than a spacing between antenna elements controlled by different ICs.

Figure 11:
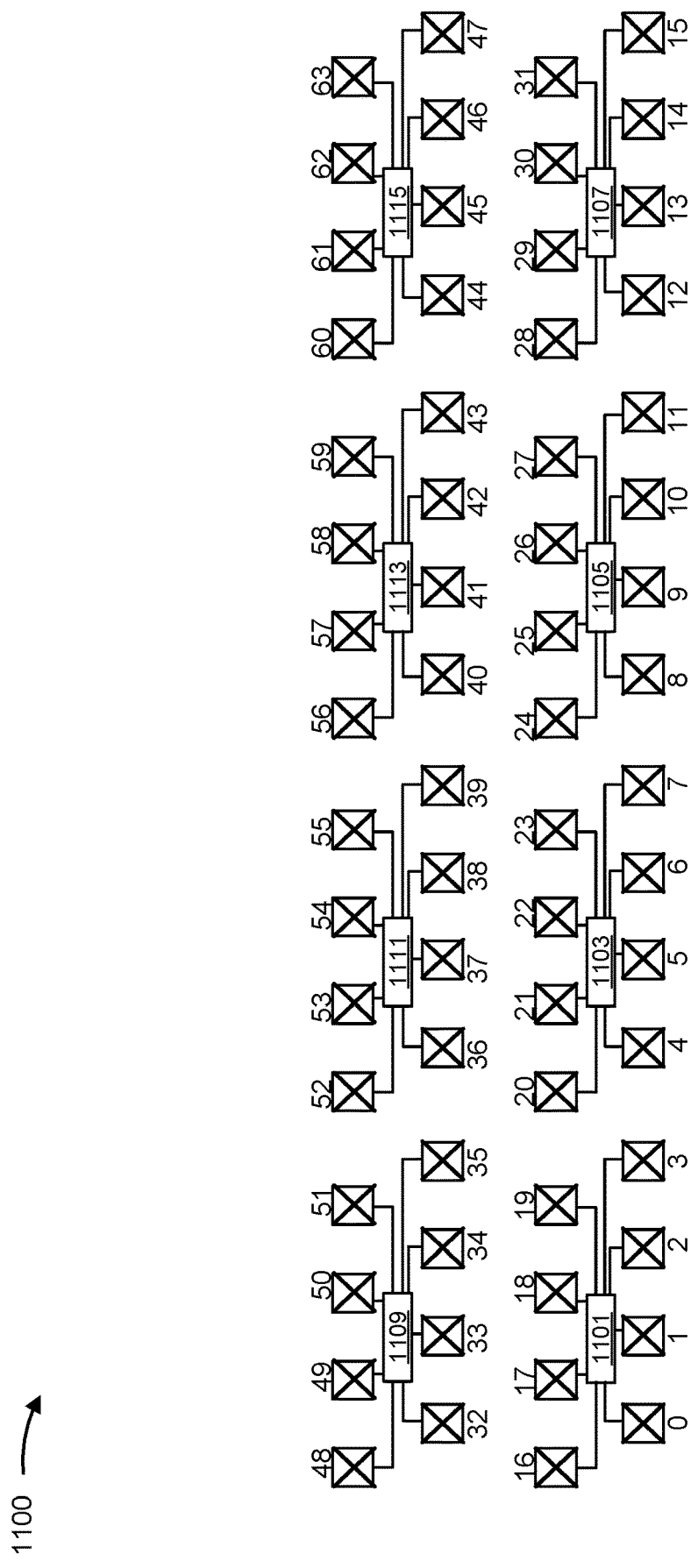
FIG. 11 is a diagram illustrating an example associated with a triangular antenna array, in accordance with the present disclosure.

FIG. 11 is a diagram illustrating an example 1100 associated with a triangular antenna array, in accordance with the present disclosure. As shown in FIG. 11, example 1100 includes an antenna panel of an RU 240 with a plurality of antenna elements. Example 1100 is similar to example 1000 of FIG. 10 but is triangular in order to increase a density of the antenna elements.

As shown in FIG. 11, IC 1101 controls antenna elements associated with indices 0, 1, 2, 3, 16, 17, 18, and 19; IC 1103 controls antenna elements associated with indices 4, 5, 6, 7, 20, 21, 22, and 23; IC 1105 controls antenna elements associated with indices 8, 9, 10, 11, 24, 25, 26, and 27; and IC 1107 controls antenna elements associated with indices 12, 13, 14, 15, 28, 29, 30, and 31. Similarly, IC 1109 controls antenna elements associated with indices 32, 33, 34, 48, 49, 50, and 51; IC 1111 controls antenna elements associated with indices 36, 37, 38, 39, 52, 53, 54, and 55; IC 1113 controls antenna elements associated with indices 40, 41, 42, 43, 56, 57, 58, and 59; and IC 1115 controls antenna elements associated with indices 44, 45, 46, 47, 61, 62, and 63. Therefore, the RU 240 may report the antenna array such that beamforming weights are received in the following order of antenna element indices: 0, 1, 2, 3, 16, 17, 18, 19; 4, 5, 6, 7, 20, 21, 22, 23; 8, 9, 10, 11, 24, 25, 26, 27; 12, 13, 14, 15, 28, 29, 30, 31; 44, 45, 46, 47, 60, 61, 62, 63; 40, 41, 42, 43, 56, 57, 58, 59; 36, 37, 38, 39, 52, 53, 54, 55; 32, 33, 34, 48, 49, 50, 51. As a result, the RU 240 may reduce caching of the beamforming weights because the beamforming weights may be fed sequentially to each IC (e.g., in the following order: IC 1101, IC 1103, IC 1105, IC 1107, IC 1115, IC 1113, IC 1111, and IC 1109).

Figure 12:
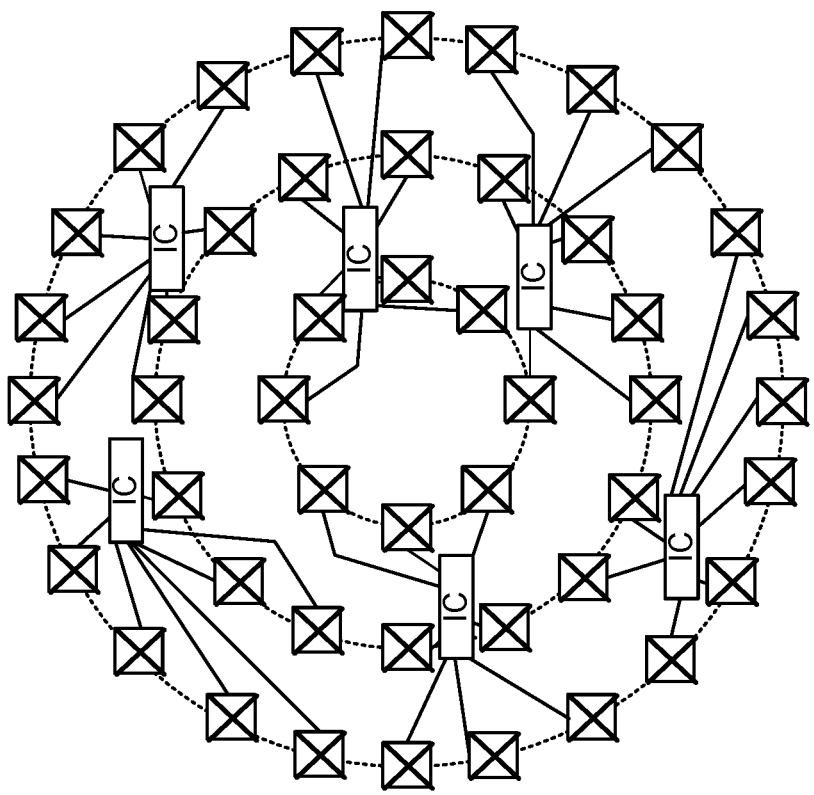
FIG. 12 is a diagram illustrating an example associated with a circular antenna array, in accordance with the present disclosure.

FIG. 12 is a diagram illustrating an example 1200 associated with a circular antenna array, in accordance with the present disclosure. As shown in FIG. 12, example 1200 includes an antenna panel of an RU 240 with a plurality of antenna elements. Similar to examples 1000 and 1100, the RU 240 may report coordinates of the antenna elements in an order corresponding to ICs controlling the antenna elements.

As indicated above, FIGS. 10-12 are provided as examples. Other examples may differ from what is described with respect to FIGS. 10-12.

Figure 13:
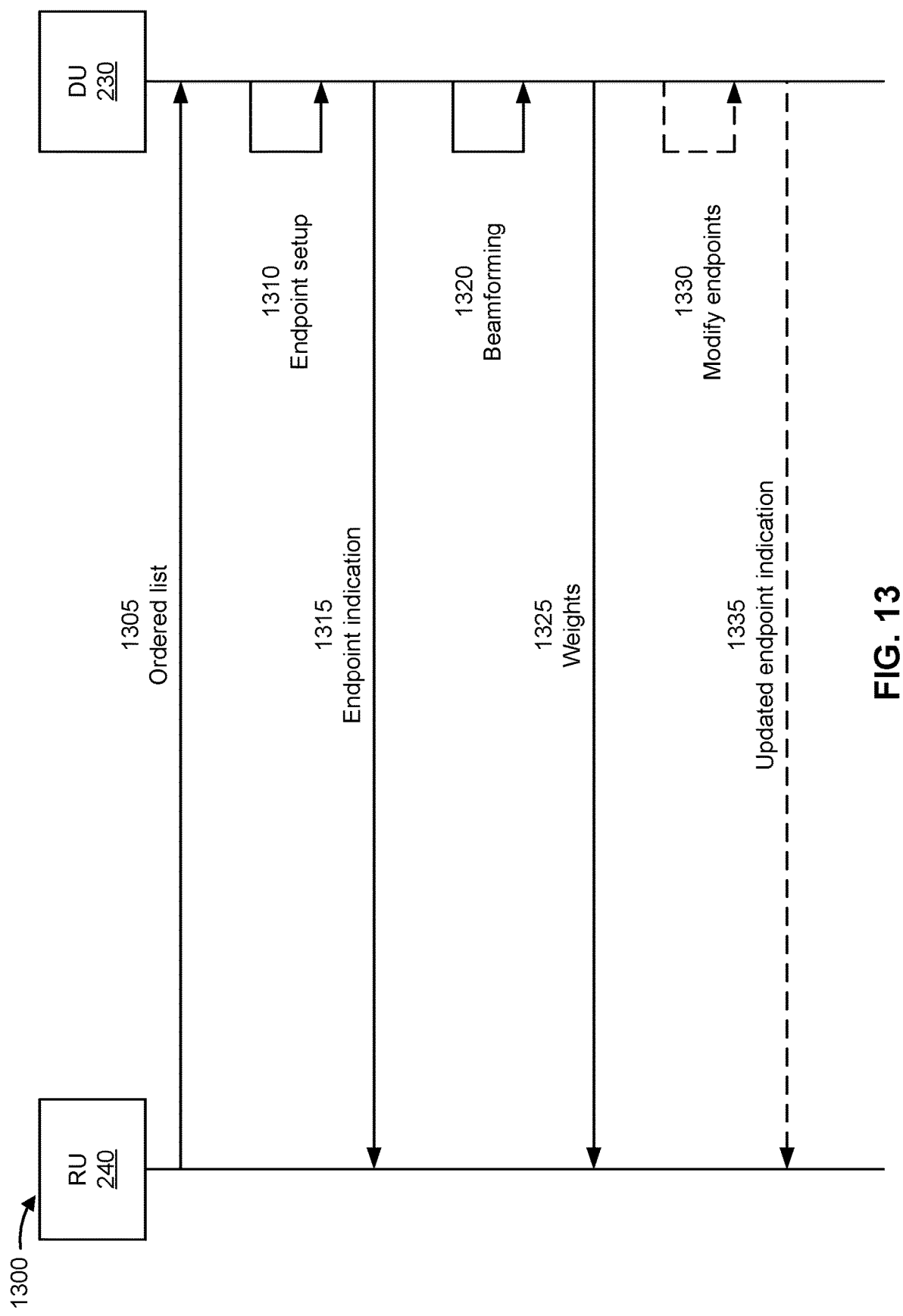
FIG. 13 is a diagram illustrating an example associated with configuring RU antenna elements using ordered lists, in accordance with the present disclosure.

FIG. 13 is a diagram illustrating an example 1300 associated with configuring RU antenna elements using ordered lists, in accordance with the present disclosure. As shown in FIG. 13, an RU 240 and a controller of the RU 240 (e.g., DU 230) may communicate with one another (e.g., on a fronthaul link, as described in connection with FIG. 2). Although described with the DU 230 as the controller, other examples may include an SMO provider (e.g., SMO Framework 205) as the controller, communicating with the RU 240 (e.g., on an O1 interface, as described in connection with FIG. 2).

As shown by reference number 1305, the RU 240 may transmit, and the DU 230 may receive, a message including an ordered list of coordinates corresponding to a plurality of antenna elements in an antenna array of the RU 240. For example, the ordered list may be as described in connection with FIG. 4 or FIG. 10 for a rectangular antenna array or as described in connection with FIG. 5-9 or 11-12 for a non-rectangular antenna array.

The RU 240 may transmit the message as part of self-description during a start-up procedure. Accordingly, the message may be transmitted on a management plane (M-plane) between the RU 240 and the DU 230. Alternatively, the RU 240 may transmit the message on a control plane (C-plane) between the RU 240 and the DU 230. Alternatively, the RU 240 may transmit the message on a new type of plane between the RU 240 and the DU 230.

In addition to the ordered list of coordinates, the RU 240 may indicate a normal vector (e.g., using a normal-vector-direction data structure that may indicate an azimuth angle and/or a zenith angle). The normal vector may indicate an outward direction of RF radiation from the antenna array. In one example, the normal vector may correspond to a lower-left antenna element. In other examples, the normal vector may correspond to a different antenna element or to a point not coinciding with an antenna element. Some examples may include a single normal vector; other examples may include a set of normal vectors corresponding to a set of the antenna elements in the antenna array. For example, a normal-vector-list-index data structure may indicate indices of antenna elements to which the normal vectors correspond.

Additionally, or alternatively, the RU 240 may indicate an antenna shape (e.g., from a plurality of possible antenna shapes in an enumerated list) associated with the antenna array. Examples of possible antenna shapes include rectangular-ordered (e.g., for a rectangular array not using O-RAN's standard ordering, as described in connection with FIG. 10), rectangular-offset (e.g., for a rectangular array with uneven spacing, as described in connection with FIG. 10), triangular-regular (e.g., as described in connection with FIGS. 6 and 11), hexagonal-regular (e.g., as described in connection with FIG. 7), circular-regular (e.g., as described in connection with FIGS. 8 and 12), or planar-irregular (e.g., for a non-regular shape), among other examples.

As shown by reference number 1310, the DU 230 may perform endpoint setup based on the ordered list of coordinates. For example, the DU 230 may map endpoints described by low-level-tx-endpoints and low-level-rx-endpoints data structures to antenna elements indicated in the message (e.g., in tx-array and rx-array data structures). An endpoint may represent a single antenna element or a subset of antenna elements, from a set of antenna elements that includes the plurality of antenna elements. Accordingly, the DU 230 may use the endpoints to transmit input signals to the RU 240 for transmission OTA using the antenna elements (e.g., using weighted beamforming, as described in connection with reference number 1325).

As shown by reference number 1315, the DU 230 may transmit, and the RU 240 may receive, an indication of one or more low-level endpoints associated with one or more activated antenna elements of the plurality of antenna elements. For example, the DU 230 may transmit the low-level-tx-endpoints and low-level-rx-endpoints data structures, as described above.

Additionally, the DU 230 may configure carriers (e.g., component carriers (CCs)) for the activated antenna element(s) to use. For example, the DU 230 may activate tx-array-carriers and rx-array-carriers data structures and associate the tx-array-carriers and rx-array-carriers data structures with low-level links terminating at the low-level endpoint(s) associated with the activated antenna element(s).

Further, as shown by reference number 1320, the DU 230 may determine beamforming weights based on the ordered list of coordinates. In some aspects, the DU 230 may use predefined-beam beamforming, weight-based dynamic beamforming (e.g., in a frequency domain, in a time domain, or a hybrid beamforming in both time and frequency domains), attribute-based dynamic beamforming, or channel-information-based beamforming.

As shown by reference number 1325, the DU 230 may transmit, and the RU 240 may receive, a beamforming configuration associated with the activated antenna element(s). For example, the beamforming configuration may indicate the beamforming weights determined based on a model applied by the DU 230 (e.g., a beamforming model selected by the DU 230). The DU 230 may periodically transmit updated beamforming configurations (e.g., for dynamic beamforming) or may transmit a static beamforming configuration (e.g., for predefined-beam beamforming).

In some aspects, the indication of the low-level endpoint(s) may be a static configuration that is not changed during active use of the carriers. For example, the low-level endpoint(s) may be established in an M-plane configuration that is fixed during use of the carriers. Alternatively, the indication may be a dynamic configuration that is changed in real time during use of the activated antenna element(s). For example, the low-level endpoint(s) may be established in a C-plane configuration that can be modified during use of the carriers.

For example, as shown by reference number 1330, the DU 230 may modify the low-level endpoint(s) (e.g., by increasing or decreasing a quantity of activated antenna element(s)). Accordingly, as shown by reference number 1335, the DU 230 may transmit, and the RU 240 may receive, an updated indication.

By using techniques as described in connection with FIG. 13, the RU 240 reports the plurality of antenna elements in an order other than a static, predefined order (e.g., left-to-right and bottom-to-top according to the network configuration sponsored by the O-RAN Alliance). As a result, the RU 240 may reduce, or even eliminate, caching of input signals from the controller in order to conserve power, processing resources, and storage. Additionally, the RU 240 reduces latency between receiving the input signals and energizing the antenna elements.

Additionally, in some aspects, the DU 230 may configure the low-level endpoint(s) so as to reduce throughput from the DU 230 to the RU 240. For example, the DU 230 may refrain from transmitting beamforming weights that the RU 240 will discard anyway (because antenna elements corresponding to those weights are inactive) and thus conserve power and processing resources as well as reduce latency.

As indicated above, FIG. 13 is provided as an example. Other examples may differ from what is described with respect to FIG. 13.

Figure 14:
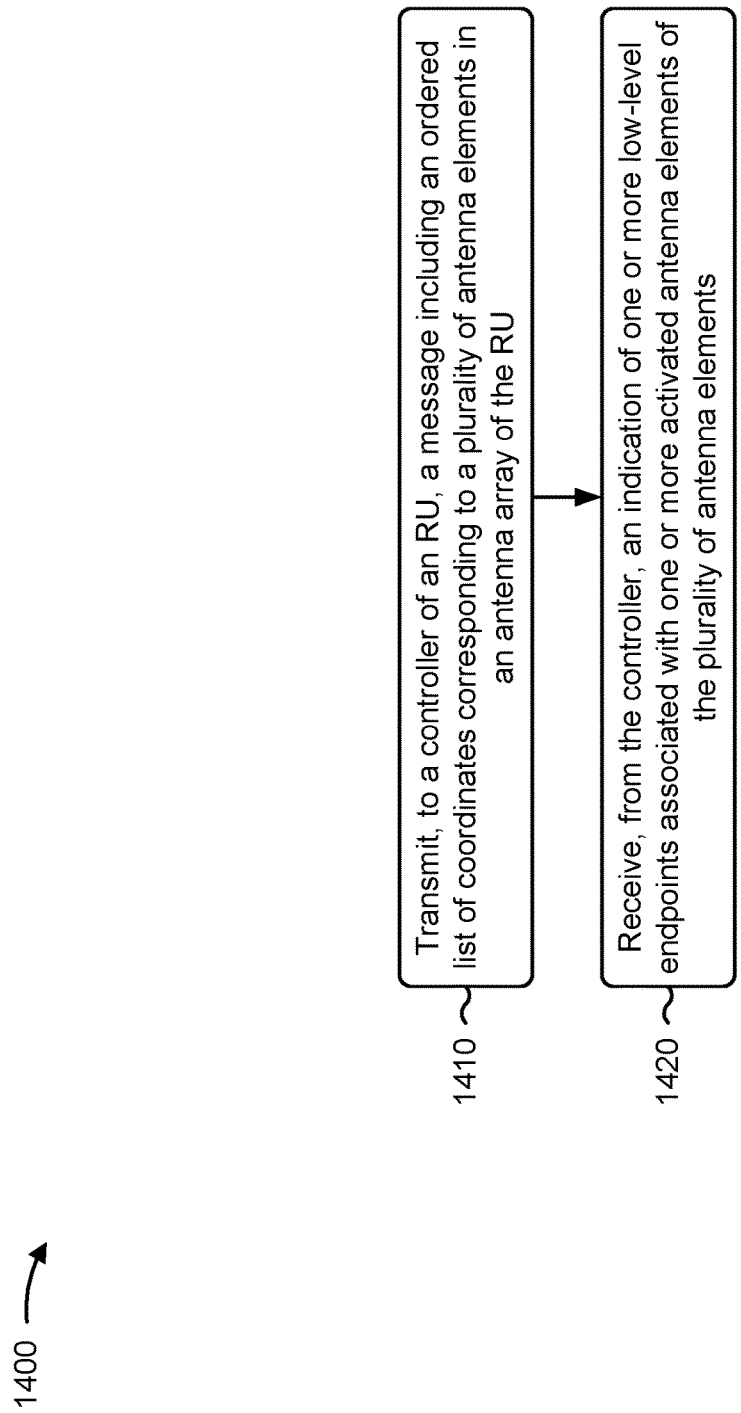
FIG. 14 is a diagram illustrating an example process performed, for example, by an RU, in accordance with the present disclosure.

FIG. 14 is a diagram illustrating an example process 1400 performed, for example, by an RU, in accordance with the present disclosure. Example process 1400 is an example where the RU (e.g., RU 240 and/or apparatus 1600 of FIG. 16) performs operations associated with configuring RU antenna elements.

As shown in FIG. 14, in some aspects, process 1400 may include transmitting, to a controller of the RU (e.g., DU 230, SMO Framework 205, and/or apparatus 1700 of FIG. 17), a message including an ordered list of coordinates corresponding to a plurality of antenna elements in an antenna array of the RU (block 1410). For example, the RU (e.g., using communication manager 250 and/or transmission component 1604, depicted in FIG. 16) may transmit, to a controller of the RU, a message including an ordered list of coordinates corresponding to a plurality of antenna elements in an antenna array of the RU, as described herein.

As further shown in FIG. 14, in some aspects, process 1400 may include receiving, from the controller, an indication of one or more low-level endpoints associated with one or more activated antenna elements of the plurality of antenna elements (block 1420). For example, the RU (e.g., using communication manager 250 and/or reception component 1602, depicted in FIG. 16) may receive, from the controller, an indication of one or more low-level endpoints associated with one or more activated antenna elements of the plurality of antenna elements, as described herein.

Process 1400 may include additional aspects, such as any single aspect or any combination of aspects described below and/or in connection with one or more other processes described elsewhere herein.

In a first aspect, the indication is a static configuration that is not changed during carrier active use.

In a second aspect, alone or in combination with the first aspect, the indication is a dynamic configuration that is changed in real time during use of the one or more activated antenna elements.

In a third aspect, alone or in combination with one or more of the first and second aspects, process 1400 includes receiving (e.g., using communication manager 250 and/or reception component 1602), from the controller, a beamforming configuration associated with the one or more activated antenna elements.

In a fourth aspect, alone or in combination with one or more of the first through third aspects, the antenna array is non-rectangular.

In a fifth aspect, alone or in combination with one or more of the first through fourth aspects, the antenna array is rectangular, and the ordered list indicates the plurality of antenna elements in an order other than left-to-right and bottom-to-top.

In a sixth aspect, alone or in combination with one or more of the first through fifth aspects, the message and the indication are associated with an M-plane between the RU and the controller.

In a seventh aspect, alone or in combination with one or more of the first through sixth aspects, the message and the indication are associated with a C-plane between the RU and the controller.

In an eighth aspect, alone or in combination with one or more of the first through seventh aspects, an order of the ordered list is based on ICs controlling the plurality of antenna elements.

In a ninth aspect, alone or in combination with one or more of the first through eighth aspects, the plurality of antenna elements are clustered according to the ICs.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
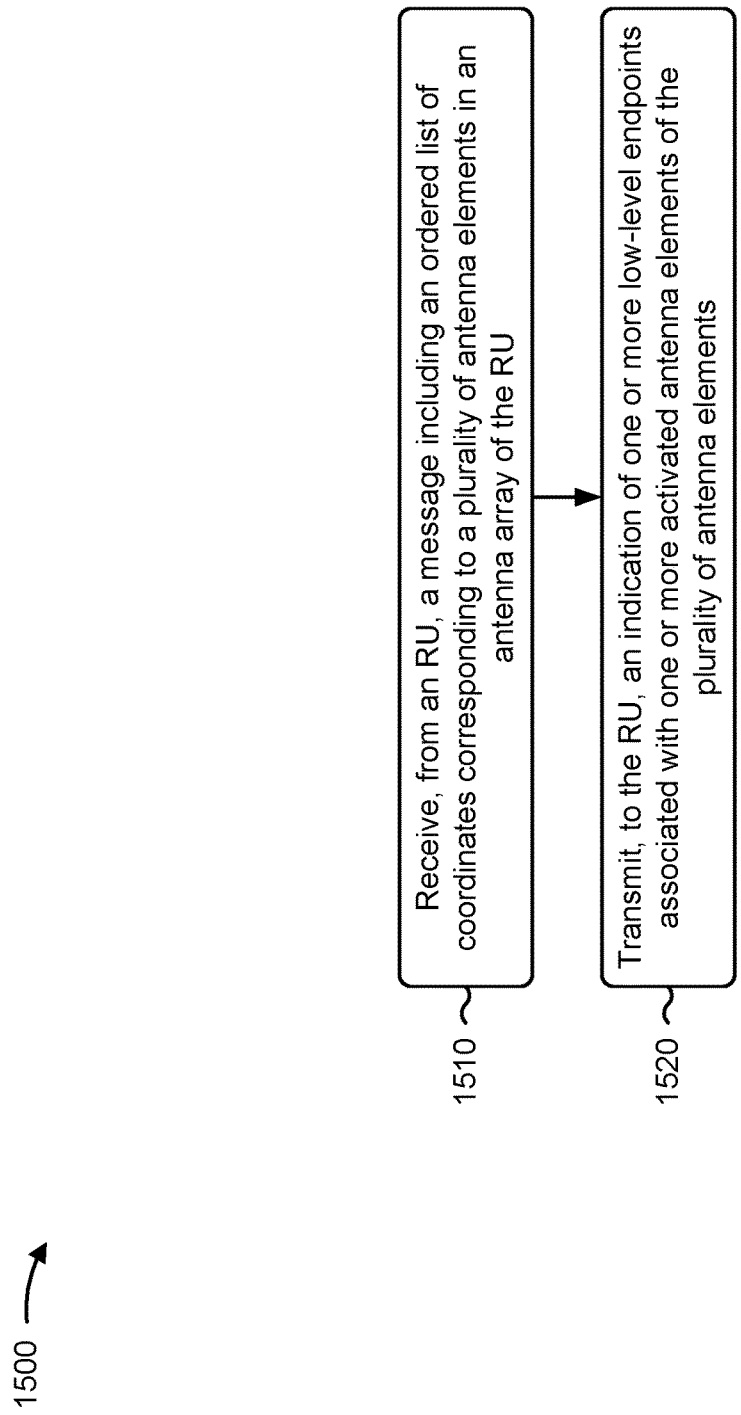
FIG. 15 is a diagram illustrating an example process performed, for example, by a controller of an RU, in accordance with the present disclosure.

FIG. 15 is a diagram illustrating an example process 1500 performed, for example, by a controller of an RU, in accordance with the present disclosure. Example process 1500 is an example where the controller (e.g., DU 230, SMO Framework 205, and/or apparatus 1700 of FIG. 17) performs operations associated with configuring RU antenna elements.

As shown in FIG. 15, in some aspects, process 1500 may include receiving, from the RU (e.g., RU 240 and/or apparatus 1600 of FIG. 16), a message including an ordered list of coordinates corresponding to a plurality of antenna elements in an antenna array of the RU (block 1510). For example, the controller (e.g., using communication manager 260 and/or reception component 1702, depicted in FIG. 17) may receive, from the RU, a message including an ordered list of coordinates corresponding to a plurality of antenna elements in an antenna array of the RU, as described herein.

As further shown in FIG. 15, in some aspects, process 1500 may include transmitting, to the RU, an indication of one or more low-level endpoints associated with one or more activated antenna elements of the plurality of antenna elements (block 1520). For example, the controller (e.g., using communication manager 260 and/or transmission component 1704, depicted in FIG. 17) may transmit, to the RU, an indication of one or more low-level endpoints associated with one or more activated antenna elements of the plurality of antenna elements, as described herein.

Process 1500 may include additional aspects, such as any single aspect or any combination of aspects described below and/or in connection with one or more other processes described elsewhere herein.

In a first aspect, the indication comprises a static configuration that is not changed during carrier active use.

In a second aspect, alone or in combination with the first aspect, the indication comprises a dynamic configuration that is changed in real time during use of the one or more activated antenna elements.

In a third aspect, alone or in combination with one or more of the first and second aspects, process 1500 includes transmitting (e.g., using communication manager 260 and/or transmission component 1704), to the RU, a beamforming configuration associated with the one or more activated antenna elements.

In a fourth aspect, alone or in combination with one or more of the first through third aspects, the antenna array is non-rectangular.

In a fifth aspect, alone or in combination with one or more of the first through fourth aspects, the antenna array is rectangular, and the ordered list indicates the plurality of antenna elements in an order other than left-to-right and bottom-to-top.

In a sixth aspect, alone or in combination with one or more of the first through fifth aspects, the message and the indication are associated with an M-plane between the RU and the controller.

In a seventh aspect, alone or in combination with one or more of the first through sixth aspects, the message and the indication are associated with a C-plane between the RU and the controller.

In an eighth aspect, alone or in combination with one or more of the first through seventh aspects, the controller is a DU or an SMO provider.

In a ninth aspect, alone or in combination with one or more of the first through eighth aspects, an order of the ordered list is based on ICs controlling the plurality of antenna elements.

In a tenth aspect, alone or in combination with one or more of the first through ninth aspects, the plurality of antenna elements are clustered according to the ICs.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
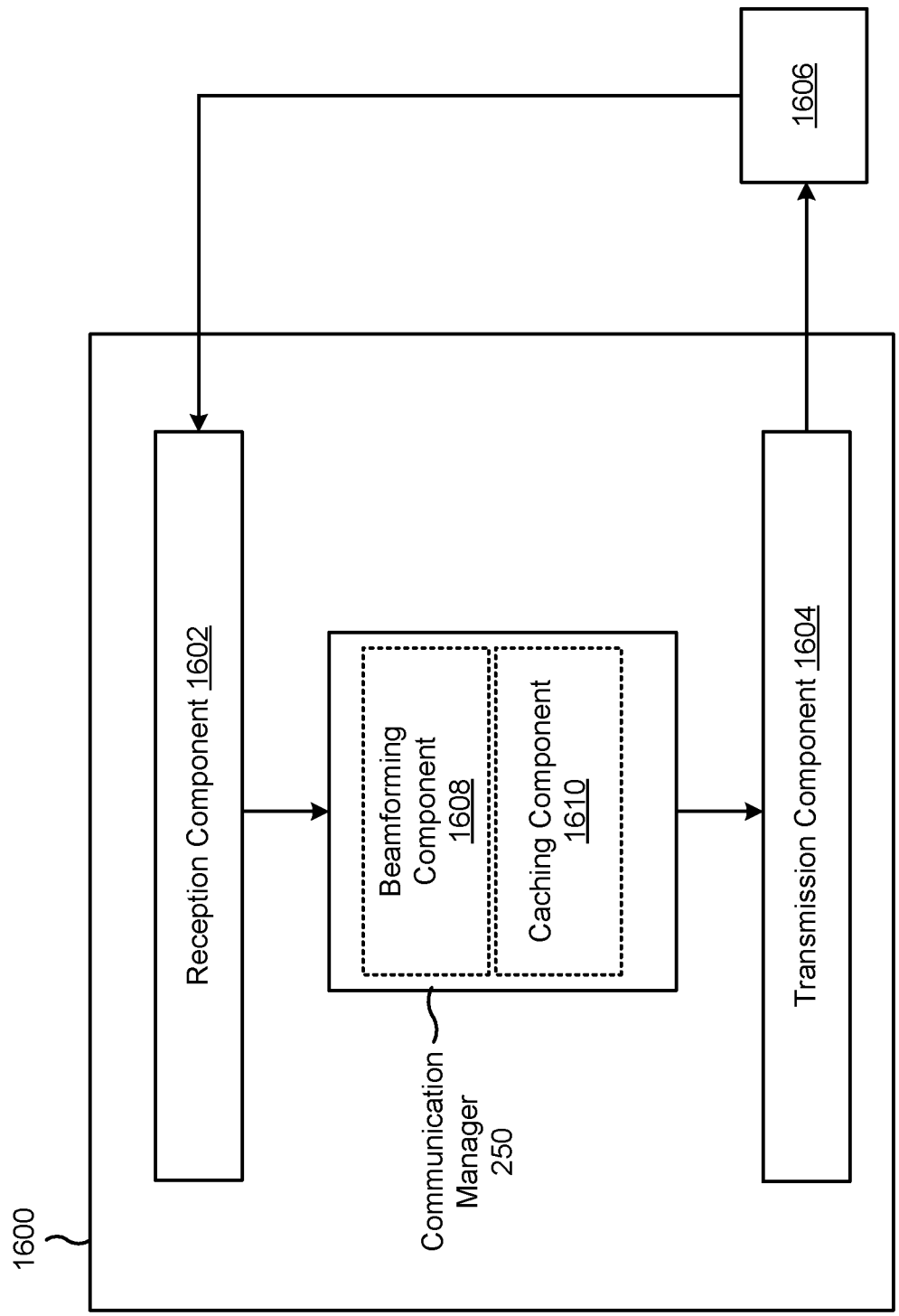
FIGS. 16 and 17 are diagrams of example apparatuses for wireless configuration, in accordance with the present disclosure.

FIG. 16 is a diagram of an example apparatus 1600 for wireless communication, in accordance with the present disclosure. The apparatus 1600 may be an RU, or a RU may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a DU, an SMO provider, or another wireless configuration device) using the reception component 1602 and the transmission component 1604. As further shown, the apparatus 1600 may include the communication manager 250. The communication manager 250 may include a beamforming component 1608 and/or a caching component 1610, among other examples.

In some aspects, the apparatus 1600 may be configured to perform one or more operations described herein in connection with FIGS. 4-13. Additionally, or alternatively, the apparatus 1600 may be configured to perform one or more processes described herein, such as process 1400 of FIG. 14, or a combination thereof. In some aspects, the apparatus 1600 and/or one or more components shown in FIG. 16 may include one or more components of the RU described in connection with FIG. 3. Additionally, or alternatively, one or more components shown in FIG. 16 may be implemented within one or more components described in connection with FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as input signals, control information, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the RU described in connection with FIG. 3.

The transmission component 1604 may transmit communications, such as control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the RU described in connection with FIG. 3. In some aspects, the transmission component 1604 may be co-located with the reception component 1602 in a transceiver.

In some aspects, the transmission component 1604 may transmit (e.g., to the apparatus 1606, such as a controller of the apparatus 1600) a message including an ordered list of coordinates corresponding to a plurality of antenna elements in an antenna array of the apparatus 1600. Accordingly, the reception component 1602 may receive (e.g., from the apparatus 1606) an indication of one or more low-level endpoints associated with one or more activated antenna elements of the plurality of antenna elements. The caching component 1610 may therefore refrain from caching input signals received from the apparatus 1606 because the ordered list indicates the plurality of antenna elements in an order such that the input signals may be directly fed to ICs associated with the one or more activated antenna elements without caching to rearrange an order of the input signals.

In some aspects, the reception component 1602 may receive (e.g., from the apparatus 1606) a beamforming configuration associated with the one or more activated antenna elements. Accordingly, the beamforming component 1608 may apply weights to input signals received from the apparatus 1606 in order to form beams using the one or more activated antenna elements.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

FIG. 17 is a diagram of an example apparatus 1700 for wireless communication, in accordance with the present disclosure. The apparatus 1700 may be a controller of an RU, or a controller of an RU may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as an RU or another wireless configuration device) using the reception component 1702 and the transmission component 1704. As further shown, the apparatus 1700 may include the communication manager 260. The communication manager 260 may include one or more of an endpoint configuration component 1708 and/or a beamforming component 1710, among other examples.

In some aspects, the apparatus 1700 may be configured to perform one or more operations described herein in connection with FIGS. 4-13. Additionally, or alternatively, the apparatus 1700 may be configured to perform one or more processes described herein, such as process 1500 of FIG. 15, or a combination thereof. In some aspects, the apparatus 1700 and/or one or more components shown in FIG. 17 may include one or more components of the DU described in connection with FIG. 3. Additionally, or alternatively, one or more components shown in FIG. 17 may be implemented within one or more components described in connection with FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as input signals, control information, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the DU described in connection with FIG. 3.

The transmission component 1704 may transmit communications, such as input signals, control information, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the DU described in connection with FIG. 3. In some aspects, the transmission component 1704 may be co-located with the reception component 1702 in a transceiver.

In some aspects, the reception component 1702 may receive (e.g., from the apparatus 1706, such as an RU) a message including an ordered list of coordinates corresponding to a plurality of antenna elements in an antenna array of the apparatus 1706. Accordingly, the transmission component 1704 may transmit (e.g., to the apparatus 1706) an indication of one or more low-level endpoints associated with one or more activated antenna elements of the plurality of antenna elements. For example, the endpoint configuration component 1708 may assign antenna elements indicated in the ordered list to corresponding low-level endpoints such that input signals may be transmitted from the apparatus 1700 to the apparatus 1706 for distribution according to the low-level endpoints.

In some aspects, the transmission component 1704 may transmit (e.g., to the apparatus 1706) a beamforming configuration associated with the one or more activated antenna elements. For example, the beamforming component 1710 may calculate weights to apply to input signals from the apparatus 1700 such that the apparatus 1706 forms beams using the one or more activated antenna elements.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless configuration performed by a radio unit (RU), comprising: transmitting, to a controller of the RU, a message including an ordered list of coordinates corresponding to a plurality of antenna elements in an antenna array of the RU; and receiving, from the controller, an indication of one or more low-level endpoints associated with one or more activated antenna elements of the plurality of antenna elements.

Aspect 2: The method of Aspect 1, wherein the indication comprises a static configuration that is not changed during carrier active use.

Aspect 3: The method of Aspect 1, wherein the indication comprises a dynamic configuration that is changed in real time during use of the one or more activated antenna elements.

Aspect 4: The method of any of Aspects 1 through 3, further comprising: receiving, from the controller, a beamforming configuration associated with the one or more activated antenna elements.

Aspect 5: The method of any of Aspects 1 through 4, wherein the antenna array is non-rectangular.

Aspect 6: The method of any of Aspects 1 through 4, wherein the antenna array is rectangular, and the ordered list indicates the plurality of antenna elements in an order other than left-to-right and bottom-to-top.

Aspect 7: The method of any of Aspects 1 through 6, wherein the message and the indication are associated with a management plane between the RU and the controller.

Aspect 8: The method of any of Aspects 1 through 6, wherein the message and the indication are associated with a control plane between the RU and the controller.

Aspect 9: The method of any of Aspects 1 through 8, wherein an order of the ordered list is based on integrated circuits (ICs) controlling the plurality of antenna elements.

Aspect 10: The method of Aspect 9, wherein the plurality of antenna elements are clustered according to the ICs.

Aspect 11: A method of wireless configuration performed by a controller of a radio unit (RU), comprising: receiving, from the RU, a message including an ordered list of coordinates corresponding to a plurality of antenna elements in an antenna array of the RU; and transmitting, to the RU, an indication of one or more low-level endpoints associated with one or more activated antenna elements of the plurality of antenna elements.

Aspect 12: The method of Aspect 11, wherein the indication comprises a static configuration that is not changed during carrier active use.

Aspect 13: The method of Aspect 11, wherein the indication comprises a dynamic configuration that is changed in real time during use of the one or more activated antenna elements.

Aspect 14: The method of any of Aspects 11 through 13, further comprising: transmitting, to the RU, a beamforming configuration associated with the one or more activated antenna elements.

Aspect 15: The method of any of Aspects 11 through 14, wherein the antenna array is non-rectangular.

Aspect 16: The method of any of Aspects 11 through 14, wherein the antenna array is rectangular, and the ordered list indicates the plurality of antenna elements in an order other than left-to-right and bottom-to-top.

Aspect 17: The method of any of Aspects 11 through 16, wherein the message and the indication are associated with a management plane between the RU and the controller.

Aspect 18: The method of any of Aspects 11 through 16, wherein the message and the indication are associated with a control plane between the RU and the controller.

Aspect 19: The method of any of Aspects 11 through 18, wherein the controller comprises a distributed unit or a service management and orchestration provider.

Aspect 20: The method of any of Aspects 11 through 19, wherein an order of the ordered list is based on integrated circuits (ICs) controlling the plurality of antenna elements.

Aspect 21: The method of Aspect 20, wherein the plurality of antenna elements are clustered according to the ICs.

Aspect 22: An apparatus for wireless communication at a device, comprising a processor; memory coupled with the processor; and instructions stored in the memory and executable by the processor to cause the apparatus to perform the method of one or more of Aspects 1-10.

Aspect 23: A device for wireless communication, comprising a memory and one or more processors coupled to the memory, the one or more processors configured to perform the method of one or more of Aspects 1-10.

Aspect 24: An apparatus for wireless communication, comprising at least one means for performing the method of one or more of Aspects 1-10.

Aspect 25: A non-transitory computer-readable medium storing code for wireless communication, the code comprising instructions executable by a processor to perform the method of one or more of Aspects 1-10.

Aspect 26: A non-transitory computer-readable medium storing a set of instructions for wireless communication, the set of instructions comprising one or more instructions that, when executed by one or more processors of a device, cause the device to perform the method of one or more of Aspects 1-10.

Aspect 27: An apparatus for wireless communication at a device, comprising a processor; memory coupled with the processor; and instructions stored in the memory and executable by the processor to cause the apparatus to perform the method of one or more of Aspects 11-21.

Aspect 28: A device for wireless communication, comprising a memory and one or more processors coupled to the memory, the one or more processors configured to perform the method of one or more of Aspects 11-21.

Aspect 29: An apparatus for wireless communication, comprising at least one means for performing the method of one or more of Aspects 11-21.

Aspect 30: A non-transitory computer-readable medium storing code for wireless communication, the code comprising instructions executable by a processor to perform the method of one or more of Aspects 11-21.

Aspect 31: A non-transitory computer-readable medium storing a set of instructions for wireless communication, the set of instructions comprising one or more instructions that, when executed by one or more processors of a device, cause the device to perform the method of one or more of Aspects 11-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless configuration at a radio unit (RU), comprising:
   one or more memories; and
   one or more processors, coupled to the one or more memories, configured to:
     transmit, to a controller of the RU, a message including an ordered list of coordinates corresponding to a plurality of antenna elements in an antenna array of the RU, wherein the ordered list includes, for each antenna element of the plurality of antenna elements, respective three-dimensional coordinate data elements and a respective polarization data element; and
     receive, from the controller, an indication of one or more low-level endpoints associated with one or more activated antenna elements of the plurality of antenna elements.

2. The apparatus of claim 1, wherein the indication comprises a static configuration that is not changed during carrier active use.

3. The apparatus of claim 1, wherein the indication comprises a dynamic configuration that is changed in real time during use of the one or more activated antenna elements.

4. The apparatus of claim 1, wherein the one or more processors are further configured to:
   receive, from the controller, a beamforming configuration associated with the one or more activated antenna elements.

5. The apparatus of claim 1, wherein the antenna array is non-rectangular.

6. The apparatus of claim 1, wherein the antenna array is rectangular, and the ordered list indicates the plurality of antenna elements in an order other than left-to-right and bottom-to-top.

7. The apparatus of claim 1, wherein the message and the indication are associated with a management plane between the RU and the controller.

8. The apparatus of claim 1, wherein the message and the indication are associated with a control plane between the RU and the controller.

9. An apparatus for wireless configuration at a controller of a radio unit (RU), comprising:
   one or more memories; and
   one or more processors, coupled to the one or more memories, configured to:
     receive, from the RU, a message including an ordered list of coordinates corresponding to a plurality of antenna elements in an antenna array of the RU, wherein the ordered list includes, for each antenna element of the plurality of antenna elements, respective three-dimensional coordinate data elements and a respective polarization data element; and
     transmit, to the RU, an indication of one or more low-level endpoints associated with one or more activated antenna elements of the plurality of antenna elements.

10. The apparatus of claim 9, wherein the indication comprises a static configuration that is not changed during carrier active use.

11. The apparatus of claim 9, wherein the indication comprises a dynamic configuration that is changed in real time during use of the one or more activated antenna elements.

12. The apparatus of claim 9, wherein the one or more processors are further configured to:

transmit, to the RU, a beamforming configuration associated with the one or more activated antenna elements.

13. The apparatus of claim 9, wherein the antenna array is non-rectangular.

14. The apparatus of claim 9, wherein the antenna array is rectangular, and the ordered list indicates the plurality of antenna elements in an order other than left-to-right and bottom-to-top.

15. The apparatus of claim 9, wherein the message and the indication are associated with a management plane between the RU and the controller.

16. The apparatus of claim 9, wherein the message and the indication are associated with a control plane between the RU and the controller.

17. The apparatus of claim 9, wherein the controller comprises a distributed unit or a service management and orchestration provider.

18. A method of wireless configuration performed by a radio unit (RU), comprising:
    transmitting, to a controller of the RU, a message including an ordered list of coordinates corresponding to a plurality of antenna elements in an antenna array of the RU, wherein the ordered list includes, for each antenna element of the plurality of antenna elements, respective three-dimensional coordinate data elements and a respective polarization data element; and
    receiving, from the controller, an indication of one or more low-level endpoints associated with one or more activated antenna elements of the plurality of antenna elements.

19. The method of claim 18, further comprising:
    receiving, from the controller, a beamforming configuration associated with the one or more activated antenna elements.

20. The method of claim 18, wherein the antenna array is non-rectangular.

21. The method of claim 18, wherein the antenna array is rectangular, and the ordered list indicates the plurality of antenna elements in an order other than left-to-right and bottom-to-top.

22. The method of claim 18, wherein the message and the indication are associated with a management plane between the RU and the controller.

23. The method of claim 18, wherein the message and the indication are associated with a control plane between the RU and the controller.

24. A method of wireless configuration performed by a controller of a radio unit (RU), comprising:
    receiving, from the RU, a message including an ordered list of coordinates corresponding to a plurality of antenna elements in an antenna array of the RU, wherein the ordered list includes, for each antenna element of the plurality of antenna elements, respective three-dimensional coordinate data elements and a respective polarization data element; and
    transmitting, to the RU, an indication of one or more low-level endpoints associated with one or more activated antenna elements of the plurality of antenna elements.

25. The method of claim 24, further comprising transmitting, to the RU, a beamforming configuration associated with the one or more activated antenna elements.

26. The method of claim 24, wherein the antenna array is non-rectangular.

27. The method of claim 24, wherein the antenna array is rectangular, and the ordered list indicates the plurality of antenna elements in an order other than left-to-right and bottom-to-top.

28. The method of claim 24, wherein the message and the indication are associated with a management plane between the RU and the controller.

29. The method of claim 24, wherein the message and the indication are associated with a control plane between the RU and the controller.

30. The method of claim 24, wherein the controller comprises a distributed unit or a service management and orchestration provider.

\* \* \* \* \*